(12) United States Patent
Wei

(10) Patent No.: US 10,531,281 B2
(45) Date of Patent: *Jan. 7, 2020

(54) APPARATUS AND METHOD IN WIRELESS COMMUNICATION SYSTEM

(71) Applicant: Sony Corporation, Tokyo (JP)

(72) Inventor: Yuxin Wei, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/351,550

(22) Filed: Mar. 13, 2019

(65) Prior Publication Data

US 2019/0274031 A1 Sep. 5, 2019

Related U.S. Application Data

(63) Continuation of application No. 15/323,303, filed as application No. PCT/CN2015/085563 on Jul. 30, 2015, now Pat. No. 10,375,570.

(30) Foreign Application Priority Data

Jul. 31, 2014 (CN) .......................... 2014 1 0371678

(51) Int. Cl.
*H04W 8/24* (2009.01)
*H04L 1/08* (2006.01)
(Continued)

(52) U.S. Cl.
CPC .............. *H04W 8/24* (2013.01); *H04B 1/713* (2013.01); *H04L 1/04* (2013.01); *H04L 1/08* (2013.01);
(Continued)

(58) Field of Classification Search
CPC ..... H04W 72/04; H04W 52/02; H04W 76/04; H04W 72/0453; H04W 72/0493;
(Continued)

(56) References Cited

U.S. PATENT DOCUMENTS

2004/0132452 A1* 7/2004 Lee ........................ H04W 80/00
455/445
2013/0223318 A1 8/2013 Liu et al.
(Continued)

FOREIGN PATENT DOCUMENTS

| CN | 102883441 A | 1/2013 |
|---|---|---|
| CN | 103825688 A | 5/2014 |
| CN | 103889071 A | 6/2014 |

OTHER PUBLICATIONS

Qualcomm Incorporated, "Details of Scheduling Assignment for D2D broadcast communication", R2-141686, 3GPPTSG-RAN WG2 #85 Bis, Mar. 31-Apr. 4, 2014, Valencia, Spain, 6 pp.
(Continued)

*Primary Examiner* — Hardikkumar D Patel
(74) *Attorney, Agent, or Firm* — Xsensus LLP

(57) ABSTRACT

An apparatus and method in a wireless communication system. The apparatus includes circuitry configured to: generate configuration information about a user equipment including retransmission time related information and used for performing device-to-device communication, wherein the re-transmission time related information represents information related to retransmission times of signal transmission with a user equipment performing device-to-device communication; and to transmit the generated configuration information to the user equipment performing device-to-device communication. A signal in device-to-device communication can be ensured to be accurately and completely transmitted between various communication devices participating in the communication, and thus the transmission performance of information is improved.

28 Claims, 21 Drawing Sheets

(51) Int. Cl.
  *H04L 1/04* (2006.01)
  *H04W 76/14* (2018.01)
  *H04B 1/713* (2011.01)
  *H04W 72/12* (2009.01)
  *H04W 74/08* (2009.01)
  *H04W 92/18* (2009.01)

(52) U.S. Cl.
  CPC ....... *H04W 72/12* (2013.01); *H04W 74/0833* (2013.01); *H04W 76/14* (2018.02); *H04W 92/18* (2013.01)

(58) Field of Classification Search
  CPC ........... H04W 52/0251; H04W 72/048; H04W 88/02; H04W 52/16; H04W 52/346; H04W 36/30; H04W 52/42; H04W 8/24; H04W 76/14; H04W 72/12; H04W 74/0833; H04W 92/18; H04W 74/08; H04W 16/10; G06F 1/324; G06F 1/3287; G06F 1/3212; G06F 1/3206; H03L 7/08; H03L 7/093; H03C 3/095; H04N 5/08; H04N 5/21; H05B 37/02; H05B 41/2928; H03K 7/04; H01J 61/827; H04B 1/713; H04L 1/04; H04L 1/08; H04L 1/1893
  See application file for complete search history.

(56) References Cited

U.S. PATENT DOCUMENTS

2014/0126527 A1    5/2014   Xiong et al.
2014/0362816 A1   12/2014   Liu et al.
2015/0222401 A1*   8/2015   Xu .......................... H04W 8/005
                                                            370/329
2016/0192424 A1*   6/2016   Suzuki ................... H04W 76/14
                                                            370/328
2017/0013466 A1*   1/2017   Xu .......................... H04L 1/1893

OTHER PUBLICATIONS

Mexican Office Action, dated Jun. 8, 2018, issued in Mexican Patent Application No. MX1a12016/016676.
"Details of Scheduling Assignment for D2D broadcast communication", Qualcomm Incorporated, 3GPP TSG-RANWG2 #85 Bis, Mar. 31-Apr. 4, 2014, RS-141686, Agenda Item 7.4.2.
Extended European Search Report dated Nov. 16, 2017 in Patent Application No. 15827842.4.
Qualcomm Incorporated: "Details of Scheduling Assignment for D2D Broadcast Communication", 3GPP TSG-RAN WG2 #85 Bis; R2-141686, 3rd Generation Partnership Project (3GPP), vol. RAN WG2, No. Valencia, Spain; Mar. 31-Apr. 4, 2014, pp. 1-6.
Qualcomm Incorporated: "eNB Resource Allocation for D2D Broadcast Communication", 3GPP TSG-RAN WG1 #76BIS R1-141451, 3rd Generation Partnership Project (3GPP), vol. RAN WG1, No. Shenzhen, China; Mar. 31-Apr. 4, 2014, pp. 1-6.
International Search Report dated Nov. 2, 2015 in PCT/CN2015/085563 filed Jul. 30, 2015.
Extended European Search Report dated Jun. 3, 2019 in European Application No. 19152860.3-1219.

* cited by examiner

APPARATUS AND METHOD IN WIRELESS COMMUNICATION SYSTEM

CROSS-REFERENCE TO RELATED APPLICATIONS

This application is a continuation of U.S. patent application Ser. No. 15/323,303, filed Dec. 30, 2016, which is based on PCT filing PCT/CN2015/085563, filed Jul. 30, 2015, which claims priority to CN 201410371678.0, filed Jul. 31, 2014, the entire contents of which are incorporated herein by reference.

FIELD

The present disclosure relates to the technical field of wireless communication, and in particular to an apparatus and a method for implementing frequency hopping in device to device (D2D) communication in a wireless communication system.

BACKGROUND

Outbreak increasing of user data raises a higher requirement for data transmission rate and transmission efficiency. As communication load between a user and a base station increases continuously, direct communication performed between adjacent devices without relay of the base station may not only reduce loads of the base station, but also facilitate reducing interference on communication of other devices since a short communication distance may result in a better signal and thus transmission power between the devices may be low. D2D communication technology is developed based on such a background.

However, the D2D communication changes the conventional user-base station communication mode, a part of functions of the base station are transplanted onto a user equipment, and hence designs for a physical layer, a MAC layer or a high layer protocol are challenges. In an LTE-A standard established by a 3GPP organization, D2D communication protocols have been discussed widely. Presently, a principal solution is to make no feedbacks for information transmitted by a counterpart user equipment between user equipments performing D2D communication, i.e., the conventional HARQ feedback mechanism in user-base station communication is not used. In this case, how to ensure each of the user equipments participating in D2D communication can still efficiently transmit and receive accurate and integrated D2D information has become a hot issue. In the present disclosure, for the above challenge caused due to introduction of the D2D technology, a transmission scheme suitable for the D2D communication is designed to ensure information transmission performance of D2D.

SUMMARY

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

In view of the above issue, an object of the present disclosure is to provide an apparatus and a method for a wireless communication system, which can achieve accurate and integrated information transmission in D2D communication. In addition, in the present disclosure, a resource scheduling scheme for D2D communication on a base station side or a user equipment side is put forward to support efficient information transmission of D2D. Furthermore, the present disclosure further proposes to use retransmission frequency hopping technology in a D2D communication process and provides a frequency hopping design scheme, thereby improving communication efficiency and information transmission performance.

According to an aspect of the present disclosure, an apparatus in a wireless communication system is provided, and the apparatus includes: a configuration information generating unit configured to generate configuration information for a user equipment performing device to device communication, the configuration information comprising retransmission number relevant information, wherein the retransmission number relevant information indicates information relevant to the number of retransmissions of signal transmission between user equipments performing device to device communication; and a transmitting unit configured to transmit the generated configuration information to the user equipment performing device to device communication.

According to another aspect of the present disclosure, an apparatus in a wireless communication system is further provided, and the apparatus includes: a signal transceiving unit configured to receive configuration information comprising retransmission number relevant information, wherein the retransmission number relevant information indicates information relevant to the number of retransmissions of signal transmission between user equipments performing device to device communication; and a controlling unit configured to control, according to the received retransmission number relevant information, the signal transceiving unit to repeatedly transmit a signal to a counterpart user equipment.

According to another aspect of the present disclosure, an apparatus in a wireless communication system is further provided, and the apparatus includes: a signal transceiving unit configured to receive configuration information comprising retransmission number relevant information, wherein the retransmission number relevant information indicates information relevant to the number of retransmissions of signal transmission between user equipments performing device to device communication; and a controlling unit configured to control, according to the received retransmission number relevant information, the signal transceiving unit to receive all signals transmitted from a counterpart user equipment.

According to another aspect of the present disclosure, a method in a wireless communication system is further provided, and the method includes: a configuration information generating step of generating configuration information for a user equipment performing device to device communication, the configuration information comprising retransmission number relevant information, wherein the retransmission number relevant information indicates information relevant to the number of retransmissions of signal transmission between user equipments performing device to device communication; and a transmitting step of transmitting the generated configuration information to the user equipment performing device to device communication.

According to another aspect of the present disclosure, a method in a wireless communication system is further provided, and the method includes: a signal transceiving step of receiving configuration information comprising retransmission number relevant information, wherein the retransmission number relevant information indicates information relevant to the number of retransmissions of signal transmission between user equipments performing device to device communication; and a controlling step of controlling, according to the received retransmission number relevant information, to repeatedly transmit a signal to a counterpart user equipment in the signal transceiving step.

According to another aspect of the present disclosure, a method in a wireless communication system is further provided, and the method includes: a signal transceiving step of receiving configuration information comprising retransmission number relevant information, wherein the retransmission number relevant information indicates information relevant to the number of retransmissions of signal transmission between user equipments performing device to device communication; and a controlling step of controlling, according to the received retransmission number relevant information, to receive all signals transmitted from a counterpart user equipment in the signal transceiving step.

According to another aspect of the present disclosure, a storage medium is further provided, and the storage medium includes machine readable program codes which, when executed on an information processing device, cause the information processing device to perform a method including: a configuration information generating step of generating configuration information for a user equipment performing device to device communication, the configuration information comprising retransmission number relevant information, wherein the retransmission number relevant information indicates information relevant to the number of retransmissions of signal transmission between user equipments performing device to device communication; and a transmitting step of transmitting the generated configuration information to the user equipment performing device to device communication.

According to another aspect of the present disclosure, a storage medium is further provided, and the storage medium includes machine readable program codes which, when executed on an information processing device, cause the information processing device to perform a method including: a signal transceiving step of receiving configuration information comprising retransmission number relevant information, wherein the retransmission number relevant information indicates information relevant to the number of retransmissions of signal transmission between user equipments performing device to device communication; and a controlling step of controlling, according to the received retransmission number relevant information, to repeatedly transmit a signal to a counterpart user equipment in the signal transceiving step.

According to another aspect of the present disclosure, a storage medium is further provided, and the storage medium includes machine readable program codes which, when executed on an information processing device, cause the information processing device to perform a method including: a signal transceiving step of receiving configuration information comprising retransmission number relevant information, wherein the retransmission number relevant information indicates information relevant to the number of retransmissions of signal transmission between user equipments performing device to device communication; and a controlling step of controlling, according to the received retransmission number relevant information, to receive all signals transmitted from a counterpart user equipment in the signal transceiving step.

According to another aspect of the present disclosure, a program product is further provided, and the program product includes machine executable instructions which, when executed on an information processing device, cause the information processing device to perform a method including: a configuration information generating step of generating configuration information for a user equipment performing device to device communication, the configuration information comprising retransmission number relevant information, wherein the retransmission number relevant information indicates information relevant to the number of retransmissions of signal transmission between user equipments performing device to device communication; and a transmitting step of transmitting the generated configuration information to the user equipment performing device to device communication.

According to another aspect of the present disclosure, a program product is further provided, and the program product includes machine executable instructions which, when executed on an information processing device, cause the information processing device to perform a method including: a signal transceiving step of receiving configuration information comprising retransmission number relevant information, wherein the retransmission number relevant information indicates information relevant to the number of retransmissions of signal transmission between user equipments performing device to device communication; and a controlling step of controlling, according to the received retransmission number relevant information, to repeatedly transmit a signal to a counterpart user equipment in the signal transceiving step.

According to another aspect of the present disclosure, a program product is further provided, and the program product includes machine executable instructions which, when executed on an information processing device, cause the information processing device to perform a method including: a signal transceiving step of receiving configuration information comprising retransmission number relevant information, wherein the retransmission number relevant information indicates information relevant to the number of retransmissions of signal transmission between user equipments performing device to device communication; and a controlling step of controlling, according to the received retransmission number relevant information, to receive all signals transmitted from a counterpart user equipment in the signal transceiving step.

According to another aspect of the present disclosure, an electronic device is further provided. The electronic device is located in a wireless communication system and includes a circuit configured to perform a method including: a configuration information generating step of generating configuration information for a user equipment performing device to device communication, the configuration information comprising retransmission number relevant information, wherein the retransmission number relevant information indicates information relevant to the number of retransmissions of signal transmission between user equipments performing device to device communication; and a transmitting step of transmitting the generated configuration information to the user equipment performing device to device communication.

According to another aspect of the present disclosure, an electronic device is further provided. The electronic device is located in a wireless communication system and includes a circuit configured to perform a method including: a signal transceiving step of receiving configuration information comprising retransmission number relevant information, wherein the retransmission number relevant information indicates information relevant to the number of retransmissions of signal transmission between user equipments performing device to device communication; and a controlling step of controlling, according to the received retransmission number relevant information, to repeatedly transmit a signal to a counterpart user equipment in the signal transceiving step.

According to another aspect of the present disclosure, an electronic device is further provided. The electronic device is located in a wireless communication system and includes a circuit configured to perform a method including: a signal transceiving step of receiving configuration information comprising retransmission number relevant information, wherein the retransmission number relevant information indicates information relevant to the number of retransmissions of signal transmission between user equipments performing device to device communication; and a controlling step of controlling, according to the received retransmission number relevant information, to receive all signals transmitted from a counterpart user equipment in the signal transceiving step.

Other aspects of the embodiments of the disclosure will be presented in the following detailed description serving to fully disclose preferred embodiments of the disclosure but not to limit the disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF THE EMBODIMENTS

Figure 1:
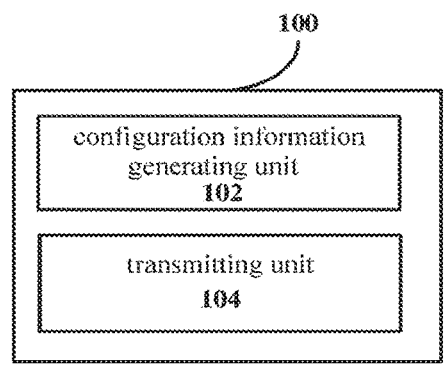
FIG. 1 is a block diagram illustrating an example of function configuration of an apparatus in a wireless communication system according to an embodiment of the present disclosure.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

According to progress of standardization of LTE-A, presently it is defined that a D2D discovery mechanism may include Type1, Type2A and Type2B, and a D2D communication mechanism may include Mode1 and Mode2. Different D2D mechanisms relate to different resource allocation manners, thereby influencing signaling design in the D2D communication and resource scheduling and parameter configuration in specific transmission.

Hereinafter, embodiments of the present disclosure will be described for each type of D2D communication/discovery mechanism in the following order.

1. First embodiment (scheme design for data signal transmission in a single-cell scene in D2D communication)
    1-1. scheme design in communication mode of mode1
        1-1-1. examples of configurations on a base station side/cluster head side in the communication mode of mode1
        1-1-2. examples of configurations on a transmitting user equipment side in the communication mode of mode1
        1-1-3. examples of configurations on a receiving user equipment side in the communication mode of mode1
    1-2. scheme design in communication mode of mode2
        1-2-1. examples of configurations on a base station side/cluster head side in the communication mode of mode2
        1-2-2. examples of configurations on a transmitting user equipment side in the communication mode of mode2
        1-2-3. examples of configurations on a receiving user equipment side in the communication mode of mode2
2. Second embodiment (scheme design for data signal transmission in a multi-cell scene in D2D communication)
    2-1. scheme design in a communication mode of mode1
    2-2. scheme design in a communication mode of mode2
3. Third embodiment (scheme design for discovery signal transmission in a single-cell scene in D2D communication)
    3-1. scheme design in a Type1 discovery mechanism
        3-1-1. examples of configurations on a base station side/cluster head side in the Type 1 discovery mechanism
        3-1-2. examples of configurations on a transmitting user equipment side in the Type 1 discovery mechanism
        3-1-3. examples of configurations on a receiving user equipment side in the Type1 discovery mechanism
    3-2. scheme design in a Type2 (including Type2A and Type2B) discovery mechanism
        3-2-1. examples of configurations on a base station side/cluster head side in the Type2B discovery mechanism
        3-2-2. examples of configurations on a user equipment side in the Type2B discovery mechanism
4. Fourth embodiment (scheduling assignment information transmission in D2D communication)
5. Application examples
    5-1. application examples for a base station
    5-2. application examples for a user equipment Firstly, a block diagram of an example of function configuration of an apparatus in a wireless communication system according to an embodiment of the present disclosure is described by referring to FIG. 1. FIG. 1 is a block diagram illustrating an example of function configuration of an apparatus in a wireless communication system according to an embodiment of the present disclosure.

As shown in FIG. 1, an apparatus 100 may include a configuration information generating unit 102 and a transmitting unit 104.

The configuration information generating unit 102 may be configured to generate configuration information for a user equipment performing D2D communication including retransmission number relevant information, and the retransmission number relevant information indicates information relevant to the number of retransmissions of signal transmission between user equipments performing D2D communication.

As described above, an HARQ feedback mechanism is absent in D2D communication. In the present disclosure, it is designed to adopt a certain amount of retransmissions in D2D communication to ensure reception accuracy of signal transmissions. In an example, the number of retransmissions is set based on the reception accuracy for a D2D signal and a resource utilization rate. In a scene of a low signal reception accuracy (which may be caused due to great network interference or high mobility of a terminal and so on), the number of retransmissions is set as a great value. Specifically, the signal reception accuracy may be determined by collecting measurement reports for a channel quality from a user equipment in a network, for example. In a scene where resources are in short supply (for example the number of user equipments performing D2D communication is great/the user equipments are distributed in a centralized manner), the number of retransmissions may be set as a small value to reduce resources used in transmitting the same signal.

The transmitting unit 104 may be configured to transmit the generated configuration information to the user equipment performing device to device communication.

It should be noted that, the configuration information generating unit 102 here may be arranged on a base station side, a D2D cluster head side for example in D2D communication, or a user equipment side transmitting a D2D signal. In a case that the configuration information generating unit 102 is arranged on the user equipment side, each of the user equipments may set the retransmission number relevant information according to a current communication condition, and the transmitting unit 104 comprises the configuration information including the retransmission number relevant information in scheduling assignment (SA) information to notify a counterpart user equipment performing D2D communication with the apparatus 100 of the retransmission number relevant information. In this case, respective user equipments may set different numbers of retransmissions.

Hereinafter specific scheme design adapting to the above various scenes in D2D communication is described in detail for a case that the configuration information generating unit 102 is arranged on the base station side or the cluster head side. It should be understood that in this case, the numbers of retransmissions for respective user equipments are the same.

1. First Embodiment

1-1. Scheme Design in a Communication Mode of Mode1

Hereinafter scheme design for data signal transmission in the communication mode of mode1 in a single-cell scene in D2D communication according to a first embodiment of the present disclosure will be described by referring to FIG. 2 to FIG. 8. In the communication mode of mode1 in D2D communication, communication resources are allocated in a centralized manner for example by a centralized apparatus (for example a base station, a baseband cloud or a cluster head).

As described above, in the present disclosure, it is designed that a certain amount of retransmissions are adopted in D2D communication to improve reception accuracy. Based on this, the inventor of the present disclosure further sets forth that a transmission resource for example frequency resource different from that for last transmission is adopted during each retransmission to sufficiently utilize frequency diversity gains, thereby further improving the reception accuracy for information in D2D communication as a whole. In the present disclosure, a resource mapping mechanism in which a transmission resource different from that for last transmission is adopted during each retransmission mentioned above is simply referred to as frequency hopping sometimes.

It should be noted that in the prior art, the base station performs resource scheduling successively for uplink transmission requests of user equipments, and each time the base station allocates the uplink resources to the user equipment, it indicates the user equipment of available uplink resources for current transmission in a form of virtual resource block (VRB). The user equipment determines an available physical resource block (PRB) according to the VRB, that is, maps the VRB to the PRB, and then utilizes the PRB to perform actual uplink transmission. Particularly, based on an indication for example a frequency hopping flag of the base station, the PRBs may directly correspond to the VRBs one by one, or the VRBs are interlaced firstly and then mapped onto PRBs having discontinuous resources according to a certain rule. For the latter case, it is also considered that the frequency hopping technology is applied to the mapping process from VRBs to the PRBs, and specific ways thereof may be referred to descriptions in the 3GPP LTE-A standard, and no repetitions will be made herein. Hence, in some examples of the present disclosure, there are two times of frequency hopping: conventional frequency hopping from the VRBs obtained from the centralized device allocating resources to the PRBs (for the transmission resources at a same time), and frequency hopping from a last transmission resource to a next transmission resource (which may be frequency hopping from the PRBs to the PRBs). The frequency hopping scheme design disclosed in the following are mainly directed to mapping from a last transmission resource to a next transmission resource, for example mapping from a first transmission resource to a first retransmission resource, and mapping from the first retransmission resource to a second retransmission resource and so on.

Preferred examples of frequency hopping scheme design in a case of mode1 are provided hereinafter. However, it should be understood that the preferred examples are only illustrative and are not intended to be restrictive, and other schemes may be conceived by those skilled in the art according to the principles of the frequency hopping scheme design of the present disclosure.

Scheme 1: it is required that resources for data signal transmission in D2D communication are distributed at edges of the whole uplink bandwidth resources and close to a physical uplink control channel (PUCCH), and a frequency span between adjacent transmission resources is great as much as possible.

Figure 2:
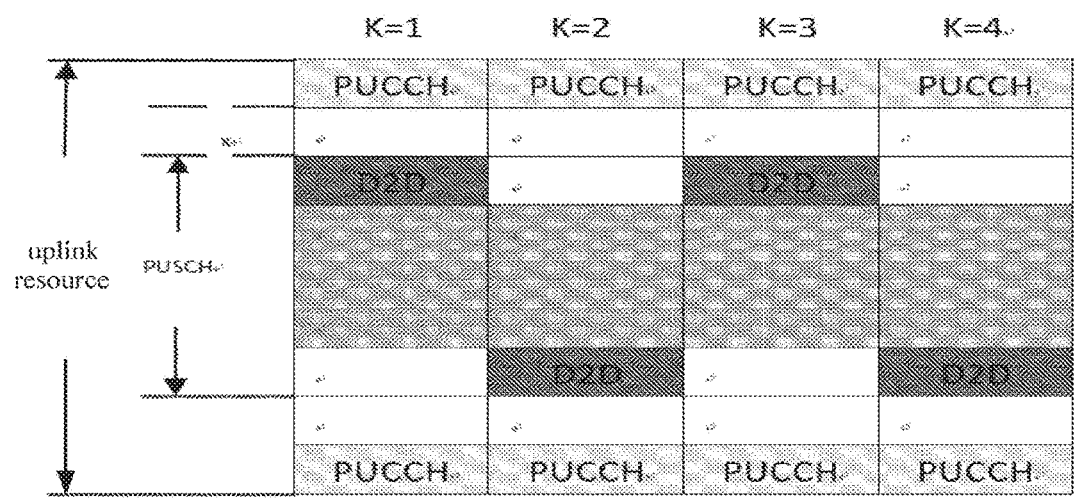
FIG. 2 is a schematic diagram illustrating distribution of data signal transmission resources in a communication mode of mode1 according to a first embodiment of the present disclosure.

FIG. 2 illustrates a schematic diagram of distribution of data signal transmission resources according to the scheme 1. As shown in FIG. 2, frequency resources for D2D communication are close to the PUCCH and adjacent transmission resources are distributed according to a principle of up-down frequency hopping, such that a frequency span between transmission resources for two adjacent transmissions is maximized. In the present disclosure, it is designed that frequency resources for D2D communication are close to the PUCCH as much as possible, such that continuous PUSCH resources are reserved to facilitate allocating resources to a conventional user equipment communicating with the base station, in addition to maximizing the frequency span. In addition, in the example shown in FIG. 2, a gap X between the frequency resources for D2D communication and the PUCCH is a protection gap arranged to prevent interference on the PUCCH. The gap may be for example set as 1 in a unified manner, or the gap may be set according a distance to the base station or the cluster head. For example, if the base station or the cluster head is nearby, the gap may be set as a greater value; otherwise, the gap may be set as a less value or zero.

Hereinafter an example of an algorithm for determining data transmission resources in the scheme 1 is described. It is assumed that an index of the frequency resource occupied by first transmitted data is f, and the index corresponds to a serial number of a resource block (RB). Firstly, the index is mapped into a D2D data area close to the PUCCH in the uplink transmission bandwidth, and is indicated by f(0).

$$f(0) = \begin{cases} n_{RBPUCCH} + x + \lfloor f/(N_{RB}^{UL}/N_{RB}^{Ddata}) \rfloor, & \text{if } f/(N_{RB}^{UL}/2) < 0 \\ N_{RB}^{UL} - 1 - (n_{RBPUCCH} + x) - \lfloor f/(N_{RB}^{UL}/N_{RB}^{Ddata}) \rfloor, & \text{otherwise} \end{cases}$$

$n_{RBPUCCH}$ indicates the number of resource blocks occupied by the PUCCH, $N_{RB}^{UL}$ indicates the number of resource blocks of a whole uplink resource, $N_{RB}^{Ddata}$ indicates the number of resource blocks of all uplink resources for D2D data communication, $\lfloor \; \rfloor$ indicates an rounding operation, and x indicates a protection gap which may be an empiric value or a predetermined value.

Indexes of frequency resources of subsequent retransmission resources are indicated by f(k), k={1, 2, . . . , K−1}, and K indicates the number of retransmissions.

$$f(k) = \begin{cases} N_{RB}^{UL} - 1 - f(0), & \text{if } k \bmod 2 = 1 \\ f(0), & \text{if } k \bmod 2 = 0 \end{cases}$$

Scheme 2: it is required that a frequency span between adjacent transmission resources is great as much as possible, and all the transmission resources are distributed as randomly as possible, so as to ensure flexibility in configuration of the frequency hopping.

Figure 3:
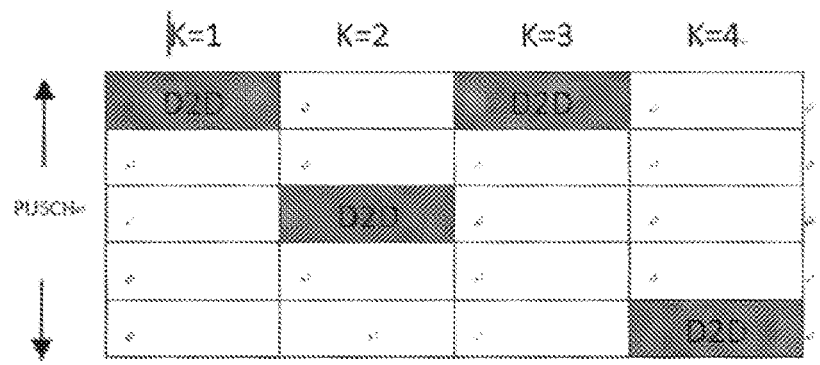
FIG. 3 is another schematic diagram illustrating distribution of data signal transmission resources in the communication mode of mode1 according to the first embodiment of the present disclosure.

FIG. 3 illustrates a schematic diagram of distribution of data signal transmission resources according to a scheme 2. As shown in FIG. 3, a frequency gap between transmission resources for two adjacent transmissions is set as an integral multiple of the number of subbands, and all the transmission resources are distributed randomly.

Hereinafter an example of an algorithm for determining data transmission resources in the scheme 2 is described. It is assumed that an index of a frequency resource occupied by first transmitted data is f. Firstly the index f may be mapped to a corresponding uplink transmission resource according to the existing frequency hopping mapping rule of the physical uplink shared channel (PUSCH), and is indicated by f(0). Indexes of frequency resources of subsequent retransmission resources are indicated by f(k), k= {1, 2, . . . , K}, where K indicates the number of retransmissions.

$$f(k) = \left\{ f(k-1) + k \times f(SA) \times \frac{N_{RB}^{PUSCH}}{K} \right\} \bmod N_{RB}^{PUSCH}$$

where $N_{RB}^{PUSCH}$ indicates the number of resource blocks of the PUSCH, and f(SA) indicates a frequency hopping parameter specified in scheduling assignment, which may be 1 or 2. A bandwidth spanned during each transmission may be specified as needed.

It can be seen from the above description that, for D2D communication, the frequency hopping scheme design according to the embodiment of the present disclosure includes two times of frequency hopping, i.e., first transmission frequency hopping and retransmission frequency hopping. In the examples of the algorithms described above, the first transmission frequency hopping refers to a mapping from the frequency index f of the first transmission resource to the actual first transmission resource f(0), and the retransmission frequency hopping refers to a mapping from the (k−1)-th transmission resource f(k−1) to the k-th transmission resource f(k). It should be understood that, in an actual application, only the first transmission frequency hopping may be applied as needed. In this case, positions of the retransmission resources and the first transmission resource are the same, without considering utilizing frequency diversity gains of multi-transmission.

1-1-1. Examples of Configuration on a Base Station Side/Cluster Head Side in the Communication Mode of Model1

Figure 4:
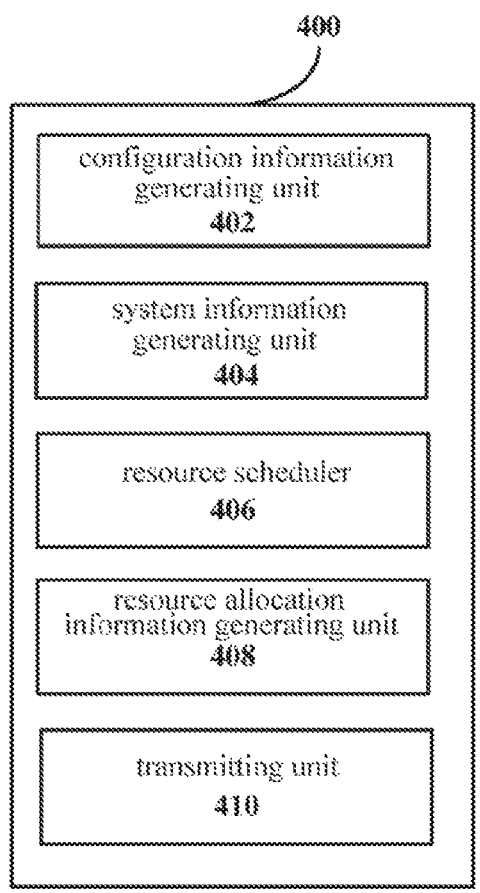
FIG. 4 is a block diagram illustrating an example of function configuration of an apparatus on a base station side/cluster head side in the communication mode of mode1 according to the first embodiment of the present disclosure.

Next, an example of function configuration of an apparatus on a base station side/cluster head side in the communication mode of model1 is described in detail by referring to FIG. 4. FIG. 4 is a block diagram illustrating an example of function configuration of an apparatus on a base station side/cluster head side in the communication mode of model1 according to the first embodiment of the present disclosure.

As shown in FIG. 4, an apparatus 400 may include a configuration information generating unit 402, a system information generating unit 404, a resource scheduler 406, a resource allocation information generating unit 408 and a transmitting unit 410. Here the examples of the function configurations of the configuration information generating unit 402 and the transmitting unit 410 are the same as those of the configuration information generating unit 102 and the transmitting unit 104 described above in conjunction with FIG. 1, and will not be repeated here. Next, only examples of function configurations of the system information generating unit 404, the resource scheduler 406 and the resource allocation information generating unit 408 are described in detail.

The system information generating unit 404 is configured to include configuration information generated by the configuration information generating unit 402 in a system information block (SIB).

The transmitting unit 410 may be configured to transmit the system information block to user equipments performing D2D communication. It should be understood that, in a case of generating the retransmission number relevant information on the base station side/cluster head side, the retransmission number relevant information for respective user equipments is generally the same, hence the transmitting unit may preferably transmit the system information block in a broadcast manner for example via a broadcast control channel (BCCH) to reduce an amount of information transmission. However, the retransmission number relevant information may also be transmitted through dedicated signaling for example, such that it is possible to configure different numbers of retransmissions for respective user equipments.

The resource scheduler 406 may be configured to allocate transmission resources for signal transmission between the user equipments performing D2D communication. Here the resource scheduler may correspond to a scheduler for scheduling uplink shared channel resources in a MAC layer for example. As described above, the resource scheduler 406 may be preferably configured to allocate resources frequencies of which are close to the PUCCH to the user equipments performing D2D communication. In addition, the resource scheduler 406 may determine a closeness degree of the transmission resources for D2D communication to the PUCCH according to a distance from the user equipment to the base station or the cluster head, for example.

The resource allocation information generating unit 408 may be configured to generate downlink control information (DCI) or random access response information including indication information of the transmission resources. The transmitting unit 410 may transmit the DCI or the random access response information to the transmitting user equipment in D2D communication via the PDCCH, to indicate the transmission resources for performing D2D communication. Here the indication information of the transmission resources corresponds to uplink grant (UL-grant) information carried by DCI format 0 for example, and a special radio network temporary identity (RNTI) is used to indicate that the UL-grant is used for D2D communication and is different from UL-grant for cellular communication. In addition, the random access response information may be transmitted via the PDCCH using the DCI format 1C.

The transmission resources include at least first transmission resource for first signal transmission of the user equipments performing D2D communication. Preferably, the transmission resources may further include retransmission resources for signal retransmission in D2D communication, and in this case the retransmission resources are determined by the base station or the cluster head, such that the first transmission resource and the retransmission resources are indicated to the user equipments explicitly. Specifically, the base station or the cluster head may determine positions of the retransmission resources according to a position of the first transmission resource. In a case of applying the frequency hopping technology to the signal retransmission, the retransmission resources may be determined using the above frequency hopping schemes for example.

Alternatively, there may exist the following case in which the base station side only allocates the first transmission resource, and the subsequent retransmission resources may be determined on the user equipment side according to a predetermined frequency hopping scheme. In this case, preferably, the configuration information generating unit 402 may be further configured to include a retransmission frequency hopping indication flag indicating whether to apply the frequency hopping technology to signal retransmission in D2D communication in the configure information, so as to be transmitted to the user equipment via the transmitting unit 410, and the user equipment may determine the subsequent retransmission resources using the predetermined frequency hopping scheme according to the received retransmission frequency hopping indication flag and the first transmission resource. Preferably, the retransmission frequency hopping indication flag may be included in the system information block and is broadcast to all the user equipments performing D2D communication via the transmitting unit 410, and each of the user equipments may determine positions of corresponding resources for signal transmission and reception.

Further, alternatively, the resource scheduler 406 may be configured to determine whether to apply the frequency hopping technology to signal retransmission so as to allocate transmission resources for D2D communication (including the first transmission resource and the retransmission resources). In this case, the transmitting unit 410 may include the indication information of the transmission resources including the retransmission frequency hopping indication flag in the DCI or the random access response information to be transmitted to the transmitting user equipment in D2D communication. In the example, the transmitting unit 410 may include both the retransmission frequency hopping indication flag and the first transmission frequency hopping indication flag in the DCI or the random access response information to be transmitted to the transmitting user equipment in D2D communication.

In addition, alternatively, the base station side may be responsible for only allocation of the first transmission resource without considering the subsequent retransmission, i.e., it is determined by the user equipment itself whether to apply the frequency hopping technology to retransmission and how to allocate the retransmission resources.

It should be understood that, in a case that the frequency hopping technology is determined to be applied to the retransmission, frequencies of each of the retransmission resources and a last transmission resource are at least different. For example, a frequency span between each of the retransmission resources and the last transmission resources meets a predetermined condition, for example the frequency span is maximized or is an integral multiple of the number of subbands. Specifically, the retransmission resources may be determined according to the frequency hopping schemes described by referring to FIG. 2 or FIG. 3 for example. In addition, in some embodiments of the present disclosure, in a case that it is not indicated whether to apply the retransmission frequency hopping technology, retransmission frequency hopping is performed by default.

1-1-2. Examples of Configurations on a Transmitting User Equipment Side in the Communication Mode of Mode1

Figure 5:
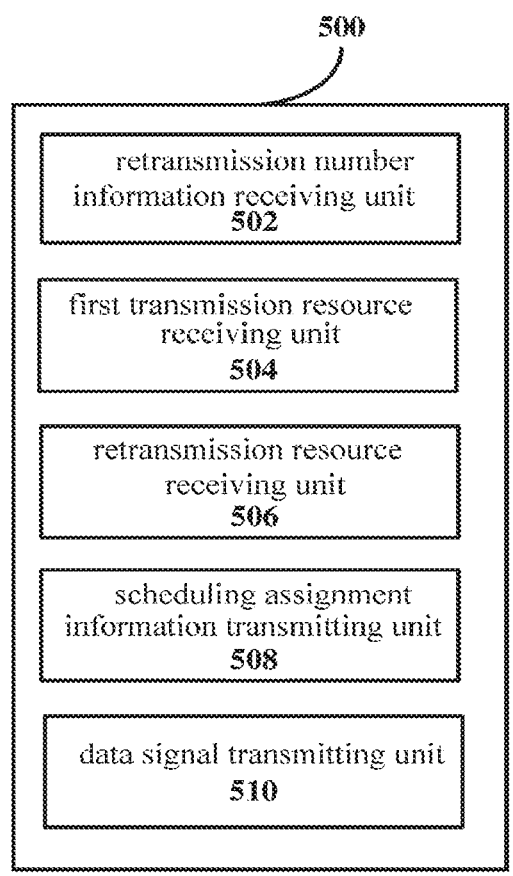
FIG. 5 is a block diagram illustrating an example of function configuration of an apparatus on a transmitting user equipment side in the communication mode of mode1 according to the first embodiment of the present disclosure.
Figure 6:
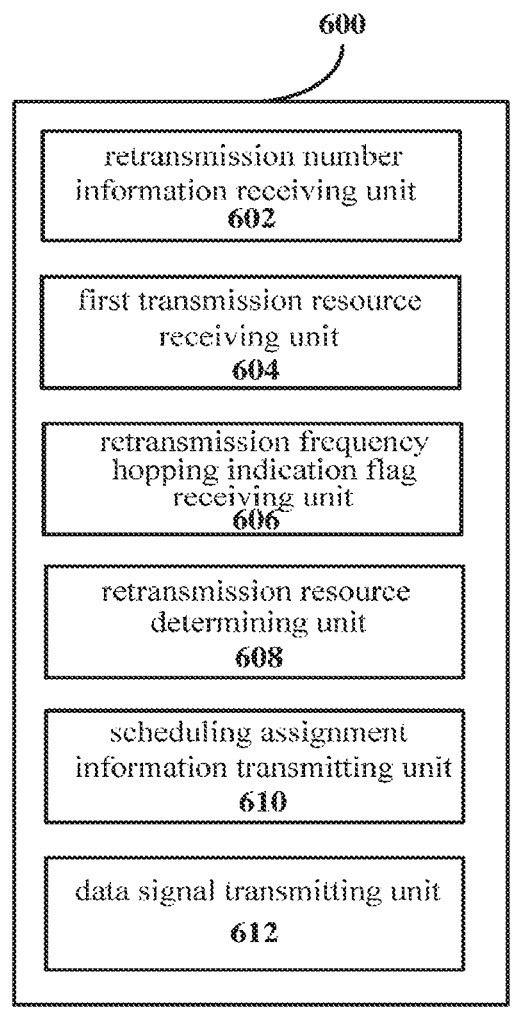
FIG. 6 is a block diagram illustrating another example of function configuration of the apparatus on the transmitting user equipment side in the communication mode of mode1 according to the first embodiment of the present disclosure.
Figure 7:
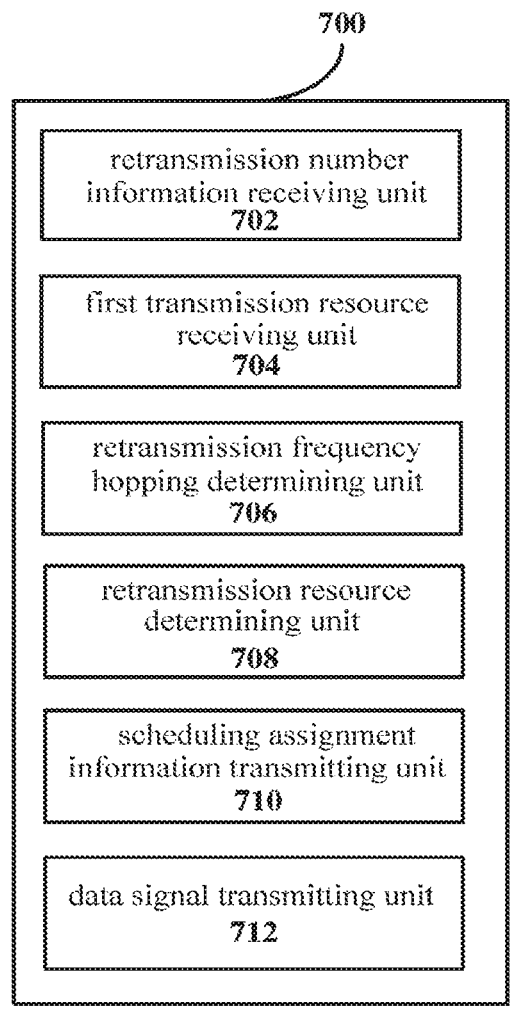
FIG. 7 is a block diagram illustrating another example of function configuration of the apparatus on the transmitting user equipment side in the communication mode of mode1 according to the first embodiment of the present disclosure.

Next, examples of function configurations of an apparatus on a transmitting user equipment side in the communication mode of mode1 are described in detail by referring to FIG. 5 to FIG. 7.

FIG. 5 is a block diagram illustrating an example of function configuration of an apparatus on a transmitting user equipment side in the communication mode of mode1 according to the first embodiment of the present disclosure.

As shown in FIG. 5, an apparatus 500 may include a retransmission number information receiving unit 502, a first transmission resource receiving unit 504, a retransmission resource receiving unit 506, a scheduling assignment information transmitting unit 508 and a data signal transmitting unit 510.

The retransmission number information receiving unit 502 may be configured to receive retransmission number information indicating the number of retransmissions between user equipments performing D2D communication.

The first transmission resource receiving unit 504 may be configured to receive a first transmission resource indication indicating first transmission resource for first transmission of a data signal in D2D communication.

The retransmission resource receiving unit 506 may be configured to receive a retransmission resource indication indicating retransmission resources for retransmission of the data signal in D2D communication.

The scheduling assignment information transmitting unit 508 may be configured to include the first transmission resource indication and the retransmission resource indication in scheduling assignment information to be transmitted to a counterpart user equipment.

The data signal transmitting unit 510 is configured to repeatedly transmit the data signal to the counterpart user equipment according to the received retransmission number information, using transmission resources indicated by the first transmission resource indication and the retransmission resource indication.

It should be noted that, in some examples of the present disclosure, the constituent units of the apparatus are divided according to certain logical functions. However, it should be understood that, functions of multiple units may be implemented by one module, and functions of one unit may be implemented by multiple modules in cooperation. For example, each of the retransmission number information receiving unit 502, the first transmission resource receiving unit 504, the retransmission resource receiving unit 506 and the data signal transmitting unit 510 may be implemented by a signal transceiving unit for example, and the scheduling assignment information transmitting unit 508 may be implemented by a control unit and a signal transceiving unit for example. The signal transceiving unit and the control unit may be specifically implemented by elements such as a radio communication interface and a processor and so on in a terminal product.

It can be seen that in the example shown in FIG. 5, the transmitting user equipment directly receives from the base station side/cluster head side explicit indications of the first transmission resource and the retransmission resources, without deducing corresponding first transmission resource and retransmission resources using the predetermined frequency hopping algorithm.

FIG. 6 is a block diagram illustrating another example of function configuration of the apparatus on the transmitting user equipment side in the communication mode of mode1 according to the first embodiment of the present disclosure.

As shown in FIG. 6, an apparatus 600 may include a retransmission number information receiving unit 602, a first transmission resource receiving unit 604, a retransmission frequency hopping indication flag receiving unit 606, a retransmission resource determining unit 608, a scheduling assignment information transmitting unit 610 and a data signal transmitting unit 612. Examples of the function configurations of the retransmission number information receiving unit 602, the first transmission resource receiving unit 604 and the data signal transmitting unit 612 are the same as those of the retransmission number information receiving unit 502, the first transmission resource receiving unit 504 and the data signal transmitting unit 510 shown in FIG. 5, and are not repeated here. Hereinafter only examples of the function configurations of the retransmission frequency hopping indication flag receiving unit 606, the retransmission resource determining unit 608 and the scheduling assignment information transmitting unit 610 are described in detail.

The retransmission frequency hopping indication flag receiving unit 606 may be configured to receive a retransmission frequency hopping indication flag indicating whether to apply frequency hopping technology to data signal retransmission in D2D communication.

The retransmission resource determining unit 608 may be configured to determine a retransmission resource indication indicating retransmission resources for data signal retransmission in D2D communication based on the first transmission resource indication and the retransmission frequency hopping indication flag. Preferably, the retransmission resource determining unit 608 may determine the retransmission resources based on the first transmission resource indication, the retransmission frequency hopping indication flag and a predetermine hopping function. The predetermined hopping function may include a frequency hopping parameter for determining a bandwidth spanned between each of the retransmission resources and a last transmission resource. The frequency hopping parameter is determined by the apparatus 600 for example.

The scheduling assignment information transmitting unit 610 is configured to include at least the first transmission resource indication in the scheduling assignment information to be transmitted to a counterpart user equipment, such that the counterpart user equipment may determine the first transmission resource and the retransmission resources. Preferably, the scheduling assignment information transmitting unit 610 may further include the frequency hopping parameter in the scheduling assignment information for the counterpart user equipment to determine the retransmission resources. Alternatively, the scheduling assignment information transmitting unit 610 may be further configured to explicitly include a retransmission resource indication indicating the retransmission resources in the scheduling assignment information to be transmitted to the counterpart user equipment.

It should be noted that, as described above, each of the retransmission number information receiving unit 602, the first transmission resource receiving unit 604, the retransmission frequency hopping indication flag receiving unit 606 and the data signal transmitting unit 612 herein may be implemented by a signal transceiving unit for example, the scheduling assignment information transmitting unit 610 may be implemented by a control unit and a signal transceiving unit for example, and the retransmission resource determining unit 608 may be implemented by a control unit for example. The signal transceiving unit and the control unit may be specifically implemented by elements such as a radio communication interface and a processor and so on in a terminal product.

It can be seen that, in the example shown in FIG. 6, the transmitting user equipment determines the retransmission resources for data signal retransmission according to the retransmission frequency hopping indication flag from the base station side/cluster head side, the first transmission resource indication and the predetermined frequency hopping scheme, rather than directly receiving the allocated retransmission resources from the base station/cluster head as in the example shown in FIG. 5. In this case, a receiving user equipment may determine the retransmission resources according to the predetermined hopping function by itself, or may directly receive the retransmission resources from the transmitting user equipment.

FIG. 7 is a block diagram illustrating another example of function configuration of the apparatus on the transmitting user equipment side in the communication mode of mode1 according to the first embodiment of the present disclosure.

As shown in FIG. 7, an apparatus 700 may include a retransmission number information receiving unit 702, a first transmission resource receiving unit 704, a retransmission frequency hopping determining unit 706, a retransmission resource determining unit 708, a scheduling assignment information transmitting unit 710 and a data signal transmitting unit 712. Examples of function configurations of the retransmission number information receiving unit 702, the first transmission resource receiving unit 704 and the data signal transmitting unit 712 are the same as those of the retransmission number information receiving unit 602, the first transmission resource receiving unit 604 and the data signal transmitting unit 612 showed in FIG. 6, and are not repeated here. Hereinafter only examples of the function configurations of the retransmission frequency hopping determining unit 706, the retransmission resource determining unit 708 and the scheduling assignment information transmitting unit 710 are described in detail.

The retransmission frequency hopping determining unit 706 may be configured to determine whether to apply the frequency hopping technology to data signal retransmission in D2D communication.

The retransmission resource determining unit 708 may be configured to determine the retransmission resources based on the first transmission resource indication and a determination result of the retransmission frequency hopping determining unit 706.

In addition, preferably, the retransmission frequency hopping determining unit 706 may be further configured to generate a retransmission frequency hopping indication flag indicating whether to apply the frequency hopping technology to data signal retransmission in D2D communication. In this case, the retransmission resource determining unit 708 may be configured to determine the retransmission resources based on the first transmission resource indication and a retransmission frequency hopping determination of the retransmission frequency hopping determining unit 706.

The scheduling assignment information transmitting unit 710 may be configured to include at least the first transmission resource indication and the retransmission frequency hopping indication flag in the scheduling assignment information to be transmitted to a counterpart user equipment for the counterpart user equipment to determine the first transmission resource and the retransmission resources. In addition, preferably, the scheduling assignment information transmitting unit 710 may also include a retransmission resource indication indicating the retransmission resources in the scheduling assignment information to be transmitted to the counterpart user equipment, and in this case, it is not necessary to transmit the retransmission frequency hopping indication flag.

It should be noted that as described above, each of the retransmission number information receiving unit 702, the first transmission resource receiving unit 704 and the data signal transmitting unit 712 herein may be implemented by a signal transceiving unit for example, the scheduling assignment information transmitting unit 710 may be implemented by a control unit and a signal transceiving unit for example, and the retransmission frequency hopping determining unit 706 and the retransmission resource determining unit 708 may be implemented by a control unit for example. The signal transceiving unit and the control unit may be specifically implemented by elements such as a radio communication interface and a processor and so on in a terminal product.

It can be seen that in the example shown in FIG. 7, the base station side/cluster head side is responsible only for indicating the first transmission resource regardless of subsequent retransmissions, and the transmitting user equipment itself may determine whether to apply the frequency hopping technology to retransmission and calculates the subsequent retransmission resources.

It should be understood that in a case that the frequency hopping technology is determined to be applied to the data signal retransmission, frequencies of each of the retransmission resources and a last transmission resource are at least different.

In addition, it should be further understood that in a case that the frequency hopping is applied to the retransmission by default, units regarding retransmission frequency hopping, for example, the retransmission frequency hopping indication flag receiving unit and the retransmission frequency hopping determining unit, may not be provided.

Here, it should be noted that the received first transmission resource indication may be a frequency resource index mapped into an area for D2D communication in the uplink transmission bandwidth, or may also be a frequency resource index before the mapping. In this case, a corresponding first transmission resource mapping unit needs to be provided on the transmitting user equipment side, which is configured to map the first transmission resource indication into a corresponding area for D2D communication in the uplink transmission bandwidth.

In addition, the apparatuses 500, 600 and 700 described above may further include an encoding unit configured to encode information to be transmitted, and then the data signal transmitting unit transmits the encoded information to the receiving user equipment apparatus. Specific encoding modes may be the same as the conventional PUSCH data encoding mode, and are not described in detail here.

1-1-3. Examples of Configuration on a Receiving User Equipment Side in the Communication Mode of Mode1

Figure 8:
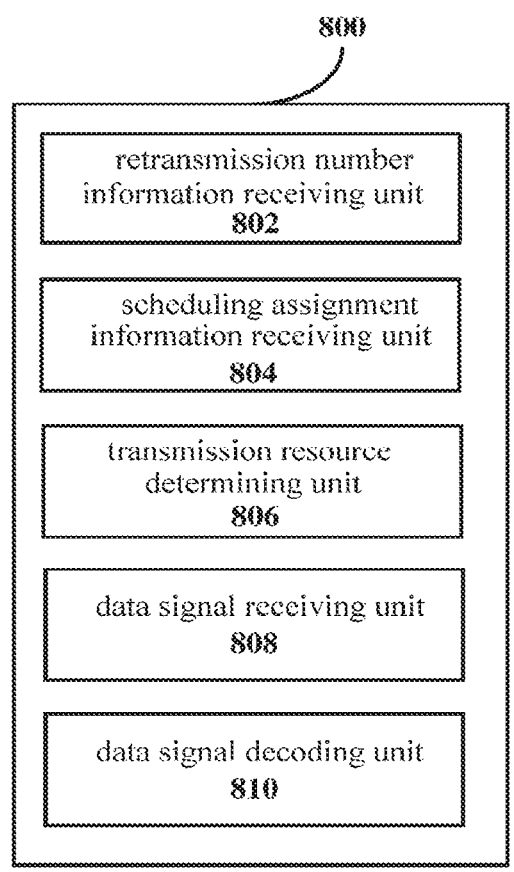
FIG. 8 is a block diagram illustrating an example of function configuration of an apparatus on a receiving user equipment side in the communication mode of mode1 according to the first embodiment of the present disclosure.

Next, an example of function configuration of an apparatus on a receiving user equipment side in the communication mode of mode1 according to the first embodiment of the present disclosure is described by referring to FIG. 8. FIG. 8 is a block diagram illustrating an example of function configuration of an apparatus on a receiving user equipment side in the communication mode of mode1 according to the first embodiment of the present disclosure.

As shown in FIG. 8, an apparatus 800 may include a retransmission number information receiving unit 802, a scheduling assignment information receiving unit 804, a transmission resource determining unit 806, a data signal receiving unit 808 and a data signal decoding unit 810.

The retransmission number information receiving unit 802 may be configured to receive retransmission number information indicating the number of retransmissions between user equipments performing D2D communication.

The scheduling assignment information receiving unit 804 may be configured to receive scheduling assignment information from a counterpart user equipment. The scheduling assignment information includes at least a first transmission resource indication indicating first transmission resource for first transmission of a data signal in D2D communication. In addition, preferably, the scheduling assignment information may further include a retransmission resource indication indicating retransmission resources for data signal retransmission in D2D communication, a frequency hopping indication flag indicating whether to apply the frequency hopping technology to retransmission and/or a frequency hopping parameter in a predetermined hopping function.

The transmission resource determining unit 806 may be configured to determine the first transmission resource and the retransmission resources based on at least the received scheduling assignment information. In addition, the transmission resource determining unit 806 may further determine the retransmission resources based on the predetermined hopping function.

The data signal receiving unit 808 may be configured to receive all data signals from the counterpart user equipment according to the received retransmission number information, the determined first transmission resource and retransmission resources.

The data signal decoding unit 810 may be configured to jointly decode all the received data signals to acquire data from the counterpart user equipment. It should be understood that as described above, each of the retransmission number information receiving unit 802, the scheduling assignment information receiving unit 804 and the data signal receiving unit 808 herein may be implemented by a signal transceiving unit for example, and the transmission resource determining unit 806 and the data signal decoding unit 810 may be implemented by a control unit for example. The signal transceiving unit and the control unit may be specifically implemented by elements such as a radio communication interface and a processor and so on in a terminal product.

1-2. Scheme Design in a Communication Mode of Mode2

Hereinafter scheme design of data signal transmission in the communication mode of mode2 in a single-cell scene in D2D communication according to the first embodiment of the present disclosure is described by referring to FIG. 9 to FIG. 13.

In the communication mode of mode2 in D2D communication, a user equipment independently selects resources for communication from a resource pool. Design examples of the frequency hopping scheme in this case are described in the following. However, it should be understood that these examples are only illustrative and are not intended to be restrictive, and those skilled in the art can conceive of other schemes according to the design principle of the frequency hopping scheme.

In this scheme, first transmission resource for first transmission of a data signal may be randomly selected from a data transmission resource pool for data transmission in D2D communication, and corresponds to an index of a certain resource block in the data transmission resource pool. Subsequent K retransmissions may occupy K continuous resource blocks within the resource pool, and whereby a receiving user equipment does not need to listen to the whole frequency band, thereby improving listening efficiency of the user equipment. In addition, a resource block occupied by each retransmission is at least different from (preferably, not adjacent to) a resource block occupied by a last retransmission, thereby obtaining a certain degree of frequency diversity gain. Specific resource block occupied by each retransmission may be determined by at least one of the following methods for example.

Method 1: an n*m (n≥2) matrix is formed by K numbers, and the matrix is filled with the K numbers in rows. Then, numbers read from the matrix in columns correspond to index numbers of resource blocks occupied by respective retransmissions respectively. In this case, resource blocks occupied by each retransmission and a last transmission are not continuous.

Method 2: an index number of a resource block occupied by k-th retransmission is represented as I(k)=(a*k+b) mod K, where k=1, 2, . . . , K.

Method 3: a number is randomly selected from 1 to K sequentially as an index number of a resource block occupied by k-th retransmission.

It should be understood that the above frequency hopping scheme design is only exemplary and is not intended to be restrictive, and those skilled in the art may conceive of other schemes according to corresponding design principles.

1-2-1. Examples of Configurations on a Base Station Side/Cluster Head Side in the Communication Mode of Mode2

Figure 9:
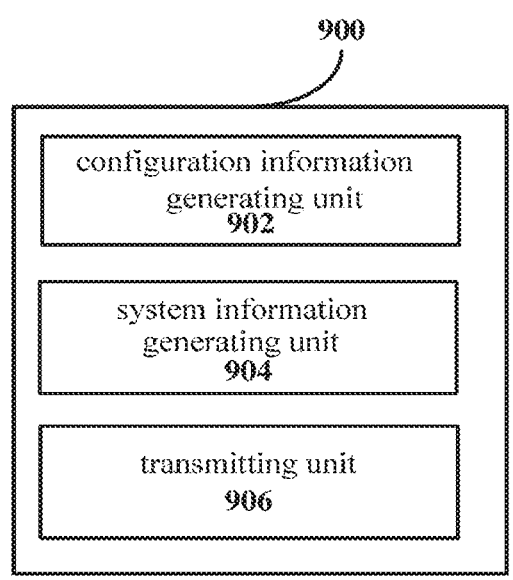
FIG. 9 is a block diagram illustrating an example of function configuration of an apparatus on a base station side/cluster head side in a communication mode of mode2 according to the first embodiment of the present disclosure.

Hereinafter an example of function configuration of an apparatus on a base station side/cluster head side in the communication mode of mode2 is described by referring to FIG. 9. FIG. 9 is a block diagram illustrating an example of function configuration of an apparatus on a base station side/cluster head side in the communication mode of mode2 according to the first embodiment of the present disclosure.

As shown in FIG. 9, an apparatus 900 may include a configuration information generating unit 902, a system information generating unit 904 and a transmitting unit 906.

The configuration information generating unit 902 may be configured to generate configuration information including at least retransmission number relevant information and data signal resource pool information. The retransmission number relevant information indicates the number of retransmissions of data signals in D2D communication, and the data signal resource pool information indicates a resource pool for data signal transmission in D2D communication. Preferably, the configuration information may further include a retransmission frequency hopping indication flag indicating whether to apply the frequency hopping technology to data signal retransmission in D2D communication. In another example of the present disclosure, the data signal resource pool is set by a system in advance, and the base station side/cluster head side and respective user equipments have default consensus, and hence the configuration information generating unit 902 does not generate configuration information for the data signal resource pool.

The system information generating unit 904 may be configured to include the configuration information generated by the configuration information generating unit 902 in a system information block.

The transmitting unit 906 may be configured to transmit the system information block including at least one of the retransmission number relevant information, the data signal resource pool information and the retransmission frequency hopping indication flag to user equipments performing D2D communication in a broadcast manner via a broadcast control channel for example.

1-2-2. Examples of Configurations on a Transmitting User Equipment Side in the Communication Mode of Mode2

Figure 10:
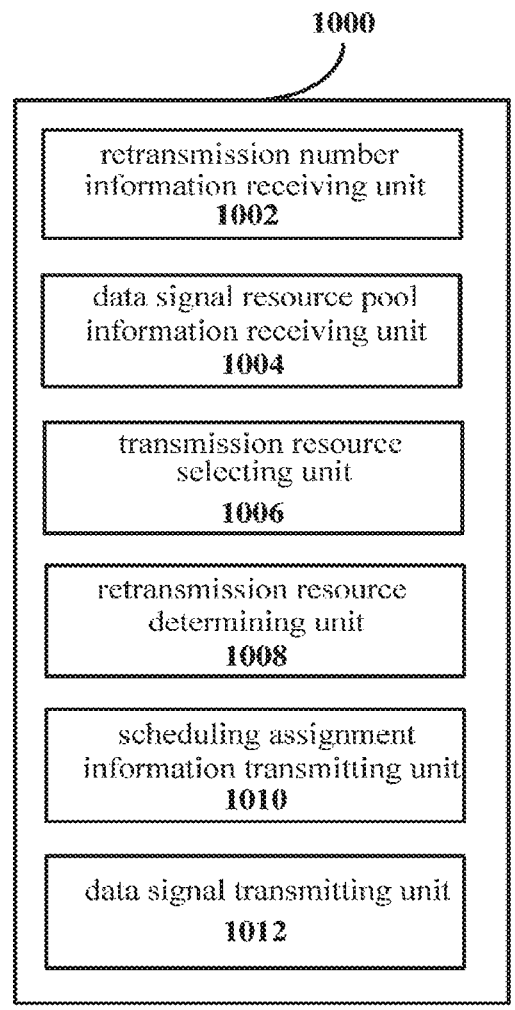
FIG. 10 is a block diagram illustrating an example of function configuration of an apparatus on a transmitting user equipment side in the communication mode of mode2 according to the first embodiment of the present disclosure.
Figure 11:
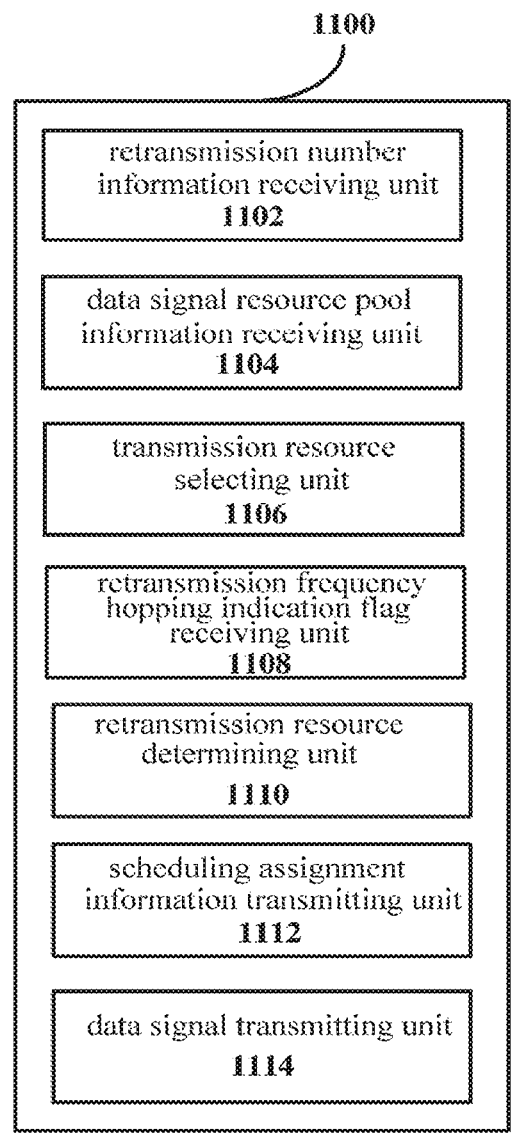
FIG. 11 is a block diagram illustrating another example of function configuration of the apparatus on the transmitting user equipment side in the communication mode of mode2 according to the first embodiment of the present disclosure.
Figure 12:
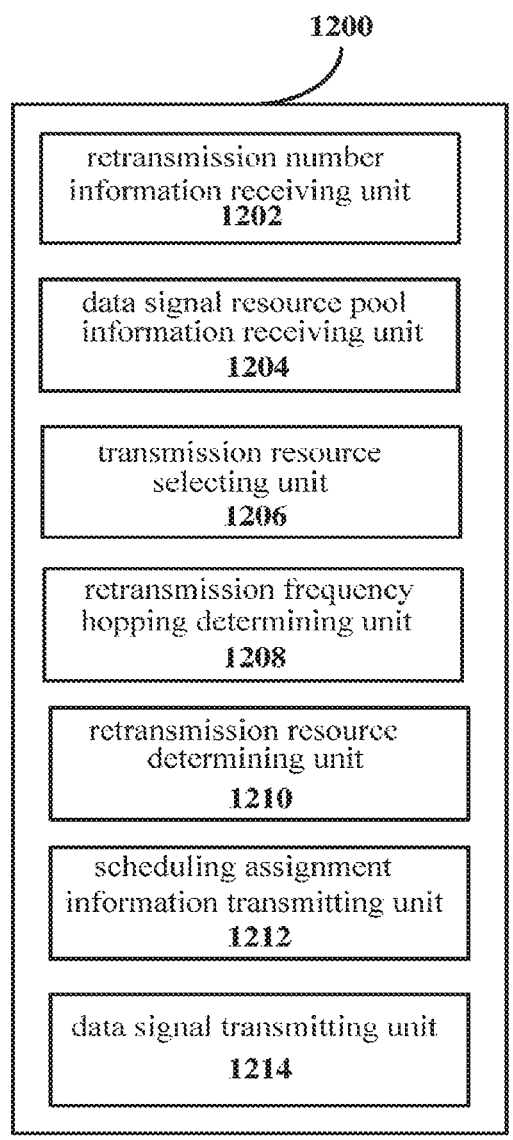
FIG. 12 is a block diagram illustrating another example of function configuration of the apparatus on the transmitting user equipment side in the communication mode of mode2 according to the first embodiment of the present disclosure.

Next, examples of configurations on a transmitting user equipment side in the communication mode of mode2 are described by referring to FIG. 10 to FIG. 12.

FIG. 10 is a block diagram illustrating an example of function configuration of an apparatus on a transmitting user equipment side in the communication mode of mode2 according to the first embodiment of the present disclosure.

As shown in FIG. 10, an apparatus 1000 may include a retransmission number receiving unit 1002, a data signal resource pool information receiving unit 1004, a transmission resource selecting unit 1006, a retransmission resource determining unit 1008, a scheduling assignment information transmitting unit 1010 and a data signal transmitting unit 1012.

The retransmission number receiving unit 1002 may be configured to receive retransmission number information indicating the number of retransmissions between user equipments performing D2D communication.

The data signal resource pool information receiving unit 1004 may be configured to receive information indicating a data signal resource pool for data signal transmission in D2D communication. Corresponding to another example on the base station side/cluster head side, in a case that the data signal resource pool is set by the system in advance, the apparatus 1000 may not include the data signal resource pool information receiving unit 1004.

The transmission resource selecting unit 1006 may be configured to select data signal transmission resources for data signal transmission from the data signal resource pool and generates resource indication information indicating the transmission resources. It should be understood that the data signal transmission resources here include at least first transmission resource for first transmission of a data signal.

The retransmission resource determining unit 1008 may be configured to determine, according to at least the first transmission resource, retransmission resources for data signal retransmission using the predetermined frequency hopping method described above, in a case that the frequency hopping technology is determined to be applied to data retransmission. In an example, the retransmission resource determining unit 1008 may generate a retransmission resource indication explicitly indicating positions where the retransmission resources are located.

The scheduling assignment information transmitting unit 1010 may be configured to include information relevant to the data signal transmission resources in scheduling assignment information to be transmitted to a counterpart user equipment. The information relevant to the data signal transmission resources includes at least the first transmission resource indication.

Preferably, the scheduling assignment information may further include information indicating which frequency hopping method (for example, the above methods 1, 2 and 3) is used, and include frequency hopping parameters in the corresponding methods (for example, the above m and n, or a and b, or the generated index random sequence). However, it should be understood that the scheduling assignment information may not include the information in a case that which frequency hopping method is used is predetermined. A receiving user equipment may determine the retransmission resources using the corresponding frequency hopping method, according to the received first transmission resource indication. In a case that the D2D retransmission frequency hopping is an optional mechanism in a communication system, the scheduling assignment information may further include a retransmission frequency hopping indication indicating whether to apply frequency hopping to retransmission for the receiving user equipment to determine the retransmission resources according to the frequency hopping mechanism. In addition, preferably, the scheduling assignment information may further include a retransmission resource indication to explicitly indicate the used retransmission resources.

The data signal transmitting unit 1012 may be configured to repeatedly transmit, according to the retransmission number information, a data signal to the counterpart user equipment using corresponding data signal transmission resources (including the first transmission resource and the retransmission resources).

It should be understood that as described above, each of the retransmission number receiving unit 1002, the data signal resource pool information receiving unit 1004 and the data signal transmitting unit 1012 herein may be implemented by a signal transceiving unit for example, the scheduling assignment information transmitting unit 1010 may be implemented by a control unit and a signal transceiving unit for example, and the transmission resource selecting unit 1006 and the retransmission resource determining unit 1008 may be implemented by a control unit for example. The signal transceiving unit and the control unit may be specifically implemented by elements such as a radio communication interface and a processor and so on in a terminal product.

FIG. 11 is a block diagram illustrating another example of function configuration of the apparatus on the transmitting user equipment side in the communication mode of mode2 according to the first embodiment of the present disclosure.

As shown in FIG. 11, as compared with the apparatus 1000 shown in FIG. 10, an apparatus 1100 further includes a retransmission frequency hopping indication flag receiving unit 1108, and the remaining units of the apparatus 1100 have the same function configurations as those of the corresponding units of the apparatus 1000, which are not repeated here. Hereinafter only an example of function configuration of the retransmission frequency hopping indication flag receiving unit 1108 is described in detail.

The retransmission frequency hopping indication flag receiving unit 1108 may be configured to receive a retransmission frequency hopping indication flag indicating whether to apply frequency hopping technology to data signal retransmission in D2D communication.

In this case, the retransmission resource determining unit 1110 may be configured to determine the retransmission resources using a predetermined frequency hopping method, based on the first transmission resource indication and the retransmission frequency hopping indication flag.

It should be understood that as described above, the retransmission frequency hopping indication flag receiving unit 1108 may be implemented by a signal transceiving unit for example. The signal transceiving unit may be specifically implemented by elements such as a radio communication interface and so on in a terminal product.

FIG. 12 is a block diagram illustrating another example of function configuration of the apparatus on the transmitting user equipment side in the communication mode of mode2 according to the first embodiment of the present disclosure.

As shown in FIG. 12, as compared with the apparatus 1000 shown in FIG. 10, a apparatus 1200 further includes a retransmission frequency hopping determining unit 1208, and the remaining units of the apparatus 1200 have the same function configurations as those of the corresponding units of the apparatus 1000, which are not repeated here. Hereinafter only an example of function configuration of the retransmission frequency hopping determining unit 1208 is described in detail.

The retransmission frequency hopping determining unit 1208 may be configured to determine whether to apply the frequency hopping technology to data signal retransmission in D2D communication.

In addition, the retransmission resource determining unit 1210 may be configured to determine the retransmission resources based on the determined first transmission resource and a determination result of the retransmission frequency hopping determining unit 1208.

Preferably, the retransmission frequency hopping determining unit 1208 may be further configured to generate a retransmission frequency hopping indication flag indicating whether to apply the frequency hopping technology to data signal retransmission in D2D communication for the receiving user equipment to determine the retransmission resources according to a frequency hopping mechanism. In this case, the scheduling assignment information transmitting unit 1212 may be configured to include the first transmission resource indication and the retransmission frequency hopping indication flag in the scheduling assignment information to be transmitted to the counterpart user equipment, such that the counterpart user equipment determines the first transmission resource and the retransmission resources according to a predetermined frequency hopping method.

In addition, preferably, the scheduling assignment information may further include a retransmission resource indication indicating the retransmission resources to explicitly indicate the first transmission resource and the retransmission resources to the counterpart user equipment.

It should be understood that, as described above, the retransmission frequency hopping determining unit 1208 herein may be implemented by a control unit for example. The control unit may be specifically implemented by elements such as a processor and so on in a terminal product.

1-2-3. Examples of Configurations on a Receiving User Equipment Side in the Communication Mode of Mode2

Figure 13:
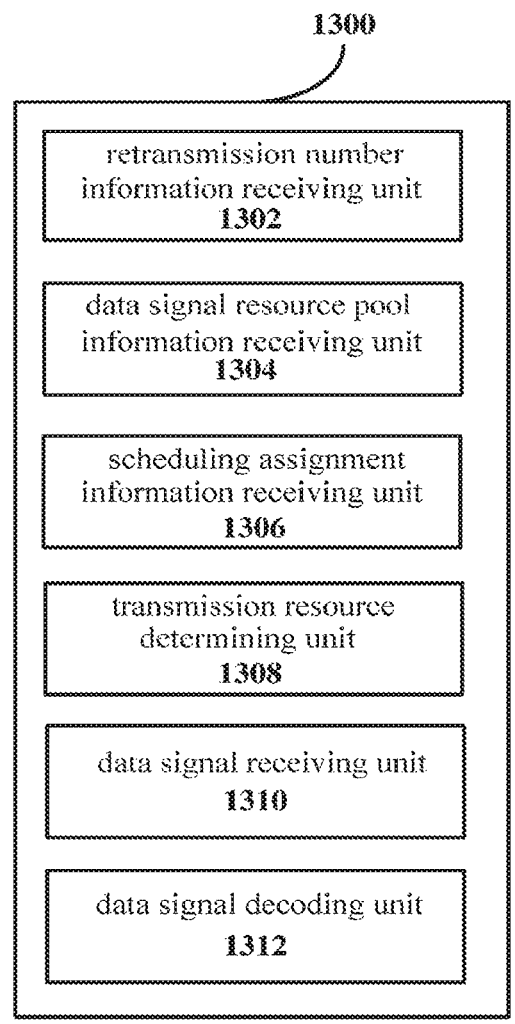
FIG. 13 is a block diagram illustrating an example of function configuration of an apparatus on a receiving user equipment side in the communication mode of mode2 according to the first embodiment of the present disclosure.

Next, an example of configuration on a receiving user equipment side in the communication mode of mode2 is described by referring to FIG. 13.

FIG. 13 is a block diagram illustrating an example of function configuration of an apparatus on a receiving user equipment side in the communication mode of mode2 according to the first embodiment of the present disclosure.

As shown in FIG. 13, as compared with the apparatus 800 shown in FIG. 8, an apparatus 1300 further includes a data signal resource pool information receiving unit 1304, and the remaining units of the apparatus 1300 have the same function configurations as those of the corresponding units in the apparatus 800, which are not repeated here. Hereinafter only an example of function configuration of the data signal resource pool information receiving unit 1304 is described in detail.

The data signal resource pool information receiving unit 1304 may be configured to receive information indicating a data signal resource pool for data signal transmission in D2D communication.

The transmission resource determining unit 1308 may be configured to determine corresponding first transmission resource and retransmission resources according to the received information of the data signal resource pool and the scheduling assignment information. In addition, in a case that the receiving user equipment determines the retransmission resources by itself, if it is determined to perform a frequency hopping operation, the transmission resource determining unit 1308 may determine the retransmission resources using a corresponding frequency hopping method, according to the received information of the data signal resource pool and the scheduling assignment information.

It should be understood that, as described above, the data signal resource pool information receiving unit 1304 may be implemented by a signal transceiving unit for example. The signal transceiving unit may be specifically implemented by elements such as a radio communication interface and so on in a terminal product.

2. Second Embodiment

In the embodiment, scheme design of data signal transmission in a multiple-cell scene in D2D communication is discussed.

In the multiple-cell scene, user equipments performing D2D communication are distributed in different cells, and respective cells may have different bandwidth configurations. For example, due to introduction of a small cell, for a resource block index number configured in a cell having a large bandwidth, if frequency hopping is performed according to the frequency hopping scheme described in the single-cell scene, the obtained resource block index number may not exist in the small cell at all. Hence, in the multiple-cell scene, the frequency hopping scheme is designed by considering the bandwidth configurations of the cells where respective user equipments are located.

In the communication mode of mode1 in D2D, the frequency hopping scheme design for a data signal in the multiple-cell scene is similar to that in the single-cell scene described above. The difference lies in that firstly indexes of the resource blocks need to be mapped according to the smallest cell bandwidth configuration, and then the frequency hopping design is performed in a manner similar to that in the single-cell scene. Specifically, firstly the first transmission resource may be mapped onto PUSCH resource corresponding to the smallest cell bandwidth, and then the retransmission resources are determined based on the smallest cell bandwidth. Preferably, a frequency span between a retransmission resource and a last transmission resource is greater than a predetermined threshold and less than the smallest cell bandwidth.

For example, as an exemplary way, the first transmission resource and the retransmission resources may be determined using the following method, but actual frequency hopping scheme design is not limited thereto. It is assumed that an index of a frequency resource occupied by first transmitted data is f and D2D data transmission covers i cells, the number of available resource blocks is $N_{RB}=\min\{N_{RB,cell1}^{PUSCH}, \ldots, N_{RB,celli}^{PUSCH}\}$, and the index f of the frequency resource is mapped onto PUSCH resource corresponding to $N_{RB}$ (indicated as $N_{RB}^{PUSCH}$), and is indicated as f(0). In addition, preferably, the index f of the frequency resource may be mapped onto PUSCH resource corresponding to $N_{RB}$ and close to PUCCH. The mapping may be implemented in multiple ways, for example $f(0)=f/(N_{RB}^{PUSCH}/N_{RB})$, but it is not limited thereto.

Frequency resource indexes f(k) (k={1, 2, . . . , K−1}) of subsequent K retransmissions may be determined as follows:

$$f(k) = \begin{cases} N_{RB} - 1 - f(0), & \text{if } k \bmod 2 = 1 \\ f(0), & \text{if } k \bmod 2 = 0 \end{cases}$$

In addition, in the multiple-cell scene, configurations on the base station side, the transmitting user equipment side and the receiving user equipment side are similar to those in the single-cell scene, and the difference lies in that the apparatus on the base station side serving the transmitting user equipment further needs to include a cell bandwidth configuration information acquiring unit configured to acquire cell bandwidth configuration information of cells where respective user equipments performing D2D communication are located, so as to indicate the transmission resources allocated by the resource scheduler with unified indexes for respective user equipments. Preferably, the transmission resources are mapped onto the uplink transmission resource corresponding to the smallest cell bandwidth. The cell bandwidth configuration information acquiring unit may acquire the cell bandwidth configuration information of respective cells through X2 interface signaling for example.

2-2. Scheme Design in the Communication Mode of Mode2

In the multiple-cell scene, scheme design in the communication mode of mode2 is substantially the same as that in the single-cell scene, and particularly, the same data signal resource pool needs to be configured for respective cells to perform D2D data communication.

In addition, in the multiple-cell scene, configurations on the base station side/cluster head side, the transmitting user equipment side and the receiving user equipment side in the communication mode of mode2 are substantially the same as those in the single-cell scene, and the difference lies in that, the base station serving the transmitting user equipment needs to transmit at least the acquired smallest cell bandwidth configuration information to the transmitting user equipment via the transmitting unit (it is not necessary to transmit all bandwidth configuration information). Preferably, if the serving base station determines a bandwidth of its own cell is the smallest, it is not necessary to transmit bandwidth configuration information of other cells. In addition, optionally, the apparatus on the transmitting user equipment side further needs to include a bandwidth configuration information receiving unit configured to receive cell bandwidth configuration information, and the bandwidth configuration information receiving unit may be implemented by a signal transceiving unit for example. The signal transceiving unit may be specifically implemented by elements such as a radio communication interface and so on in a terminal product.

In this case, the apparatus on the transmitting user equipment side determines the first transmission resource and the retransmission resources for the data signal based on the smallest cell bandwidth.

3. Third Embodiment

In D2D communication, a discovery process is optional and is implemented by occupying PUSCH resources to transmit MAC PDU (protocol data unit). Transmission time of a discovery signal is determined by a predefined discovery period during which the MAC PDU may be repeatedly transmitted. The discovery process in D2D communication mainly differs from the data communication process in that, the discovery process is half-duplex, which means that a certain user equipment performing D2D communication, when transmitting a discovery signal, can not receive a discovery signal transmitted from other user equipments. Hence, in a time-frequency resource allocation scheme for the discovery signal, allocation of both time-domain resources and frequency-domain resources needs to be considered.

A discovery signal resource pool is dedicatedly preconfigured for transmission and reception of the discovery signal, and thus all signals transmitted and received in the resource pool are considered as discovery signals. The discovery signal resource pool may be predetermined by the system, or determined by the base station or the cluster head in a semi-static manner for example.

In addition, in D2D communication, according to allocation manners of communication resources for the discovery signal, different time-frequency resource allocation schemes adapting to the discovery signal may be designed. It should be noted that due to the importance of the discovery signal, in D2D communication, retransmission may be needed to be performed by default and frequency hopping is achievable. In most preferable examples of the present disclosure, the frequency hopping technology is applied to retransmission of the discovery signal by default. Alternatively, the base station side or the cluster head side may determine whether to apply the frequency hopping technology, and include a flag indicating whether to apply the frequency hopping technology in a system information block to be broadcast to the user equipments. Alternatively, whether to perform the frequency hopping may be determined by the user equipment itself.

In addition, it should be noted that since there is no aforehand scheduling assignment information notification for the discovery signal and the discovery signal includes no identity authentication information (for example ID, such as RNTI or the like), a user equipment receiving the discovery signal does not know the discovery signal is transmitted from which user equipment in a physical layer. Therefore, how to track the discovery signal repeatedly transmitted from the same user equipment is a difficult problem. In the present disclosure, a time-frequency resource allocation scheme for the discovery signal is designed creatively in which time and frequency corresponding to each transmission resource are correlated with time and frequency for next transmission resource. In the discovery process, the receiving user equipment listens to all discovery signals in the discovery signal resource pool, determines, upon receipt of the discovery signal for the first time, time-frequency resources where a discovery signal to be transmitted subsequently each time is located according to time-frequency resources where the discovery signal is located and in conjunction with a predetermined time-frequency resource allocation scheme, receives all the discovery signals to be transmitted subsequently, and decodes all the discovery signals based on a high layer protocol to determine specific information included in the discovery signals (for example, an ID of the transmitting user equipment or the like).

3-1. Scheme Design of Time-Frequency Resource Allocation in Type1 Discovery Mechanism Hereinafter scheme design of time-frequency resource allocation for discovery signal transmission in Type1 discovery mechanism in D2D communication according to a third embodiment of the present disclosure is described by referring to FIG. 14 to FIG. 17.

The Type1 discovery mechanism means that resources (including time-domain resources and frequency-domain resources) for transmission of the discovery signal are not allocated based on user equipments, but are shared by all user equipments or a set of user equipments, and the resources may be allocated in advance. Such resource allocation manner essentially belongs to distributed resource allocation, and hence how to avoid collisions between time-frequency resources selected by the user equipments themselves and disadvantageous factors in half-duplex to the greatest degree might become a key point in design of the time-frequency resource allocation scheme in this case.

The inventor of the present disclosure designs such that a possibility that different user equipments select the same time-frequency resource is reduced as much as possible, and if user equipments randomly select the same time-frequency resource, time resources used by these user equipments are spaced apart as much as possible during subsequent retransmissions.

As an exemplary way, it is assumed that the discovery period is P (which may be reconfigured and broadcast by a centralized management apparatus for example a base station/cluster head, but is valid for all user equipments managed by the same management apparatus), and a retransmission period for the discovery signal is M (P is an integral multiple of M, M may be reconfigured and is valid for all the user equipments, and in a case that the number of retransmissions K is given, M=P/K). Assuming that the number of available resource blocks for the discovery signal is $N_{RB}^{Dis}$, a time-domain subframe number for first transmission of the discovery signal which is randomly selected by the transmitting user equipment is m (m=1, 2, . . . , M), and a frequency-domain index number is n (n=1, 2, . . . , $N_{RB}^{Dis}$), then indexes of time-frequency resources occupied by subsequent k-th transmission are t(k) (t(1)=m) and f(k) (f(1)=n), k={2, . . . , P/M}.

$$t(k)=\{(t(k-1)+[f(k-1)\times k])\} \bmod M$$

$$f(k)=\{f(k-1)+[k\times N_{RB}^{Dis}/M]\} \bmod N_{RB}^{Dis}$$

Figure 14:
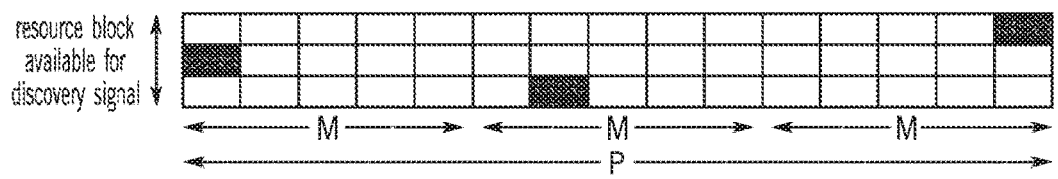
FIG. 14 is a schematic diagram illustrating distribution of time-frequency resources for a discovery signal in a Type1 discovery mechanism according to a third embodiment of the present disclosure.

FIG. 14 illustrates a time-frequency resource distribution diagram obtained according to the time-frequency resource allocation scheme. As shown in FIG. 14, time domain resources and frequency domain resources occupied by different transmissions are different. It should be understood that the time-frequency resource allocation scheme described here is only exemplary and is not intended to be restrictive, and those skilled in the art may conceive of different time-frequency resource allocation schemes according to the design principle.

In the Type1 discovery mechanism, configuration information for the discovery signal resource pool, the discovery period and the retransmission number relevant information (the retransmission number or the retransmission period) may be included in the system information block, and is notified to all user equipments performing D2D communication by broadcasting. Similar to the examples described above, in a case that information for example the discovery signal resource pool, the discovery period and the like is preset by a system, the configuration information may not include the information.

Figure 15:
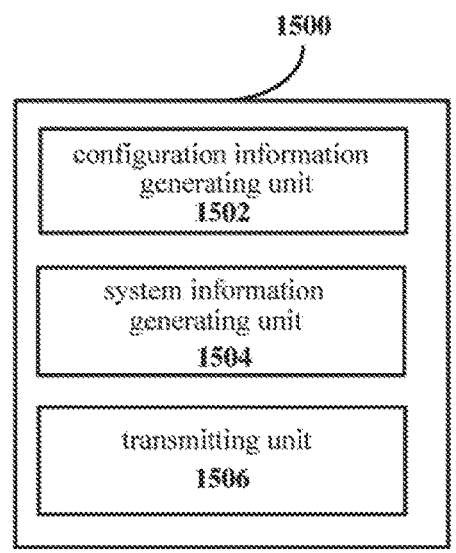
FIG. 15 is a block diagram illustrating an example of function configuration of an apparatus on a base station side/cluster head side in the Type1 discovery mechanism according to the third embodiment of the present disclosure.

3-1-1. Examples of Configurations on a Base Station Side/Cluster Head Side in the Type 1 Discovery Scheme Next, an example of function configuration of an apparatus on a base station side/cluster head side in the Type 1 discovery scheme is described in detail by referring to FIG. 15. FIG. 15 is a block diagram illustrating an example of function configuration of an apparatus on a base station side/cluster head side in the Type 1 discovery scheme according to the third embodiment of the present disclosure.

As shown in FIG. 15, an apparatus 1500 may include a configuration information generating unit 1502, a system information generating unit 1504 and a transmitting unit 1506.

The configuration information generating unit 1502 may be configured to generate configuration information including retransmission number relevant information and discovery period information for a discovery signal. In a discovery period, user equipments performing D2D communication transmit a discovery signal. In some examples of the present disclosure, the discovery period may refer to a certain period of time, and the configuration information thereof includes a discovery start time instant and a discovery end time instant for example. In another example of the present disclosure, the discovery period may refer to a repeated period of time, and the configuration information thereof includes a period length and a repeated period for example. It should be understood that the retransmission number relevant information here may refer to a retransmission period or the number of retransmissions.

Preferably, the configuration information generated by the configuration information generating unit 1502 may further include information of a discovery signal resource pool for transmission of the discovery signal, and the discovery signal resource pool is shared by all user equipments performing D2D communication. Alternatively, the discovery signal resource pool may be preconfigured, without being allocated by the base station/cluster head.

The system information generating unit 1504 may be configured to include the configuration information in a system information block.

The transmitting unit 1506 may be configured to transmit the system information block to the user equipment performing D2D communication by broadcasting for example.

Figure 16:
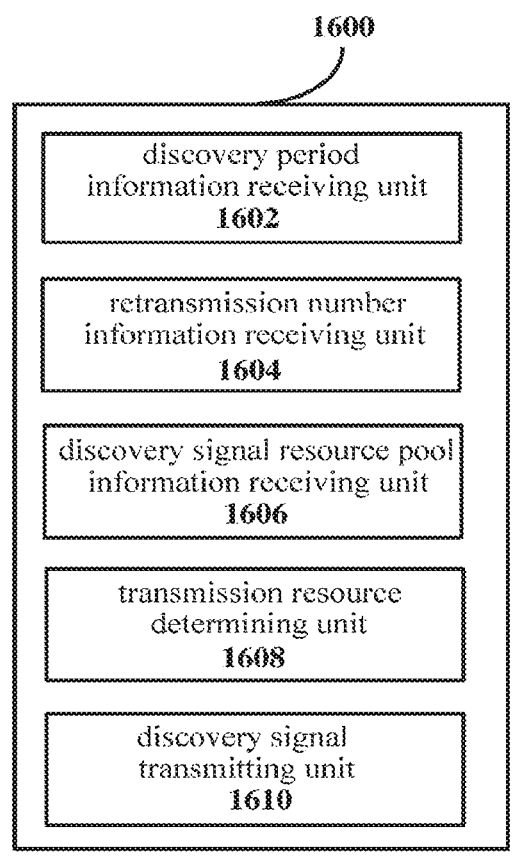
FIG. 16 is a block diagram illustrating an example of function configuration of an apparatus on a transmitting user equipment side in the Type1 discovery mechanism according to the third embodiment of the present disclosure.

3-1-2. Examples of Configurations on a Transmitting User Equipment Side in the Type1 Discovery Mechanism Next, an example of function configuration of an apparatus on a transmitting user equipment side in the Type1 discovery mechanism according to the third embodiment of the present disclosure is described by referring to FIG. 16. FIG. 16 is a block diagram illustrating an example of function configuration of an apparatus on a transmitting user equipment side in the Type 1 discovery mechanism according to the third embodiment of the present disclosure.

As shown in FIG. 16, an apparatus 1600 may include a discovery period information receiving unit 1602, a retransmission number information receiving unit 1604, a discovery signal resource pool information receiving unit 1606, a transmission resource determining unit 1608 and a discovery signal transmitting unit 1610.

The discovery period information receiving unit 1602 may be configured to receive information of a discovery period in which a discovery signal is transmitted.

The retransmission number information receiving unit 1604 may be configured to receive information related to the number of retransmissions of the discovery signal in the discovery period. The information related to the number of retransmissions may be the number of retransmissions or a retransmission period.

The discovery signal resource pool information receiving unit 1606 may be configured to receive information of a discovery signal resource pool for transmission of the discovery signal. It should be understood that in a case that the discovery signal resource pool is preconfigured, the discovery signal resource pool information receiving unit 1606 may be not provided.

The transmission resource determining unit 1608 may be configured to randomly select first transmission resource for first transmission of the discovery signal from the discovery signal resource pool, and periodically select, based on a predetermined hopping function (for example, the above exemplary time-frequency resource allocation scheme), retransmission resources with the number of retransmissions, each of which is different from each other transmission resource in both time-domain and frequency-domain, within the discovery period.

The discovery signal transmitting unit 1610 may be configured to repeatedly transmit the discovery signal using the determined first transmission resource and retransmission resources according to the retransmission number relevant information.

It should be understood that, as described above, each of the discovery period information receiving unit 1602, the retransmission number information receiving unit 1604, the discovery signal resource pool information receiving unit 1606 and the discovery signal transmitting unit 1610 here may be implemented by a signal transceiving unit for example, and the transmission resource determining unit 1608 may be implemented by a control unit for example. The signal transceiving unit and the control unit may be specifically implemented by elements such as a radio communication interface and a processor and so on in a terminal product.

Figure 17:
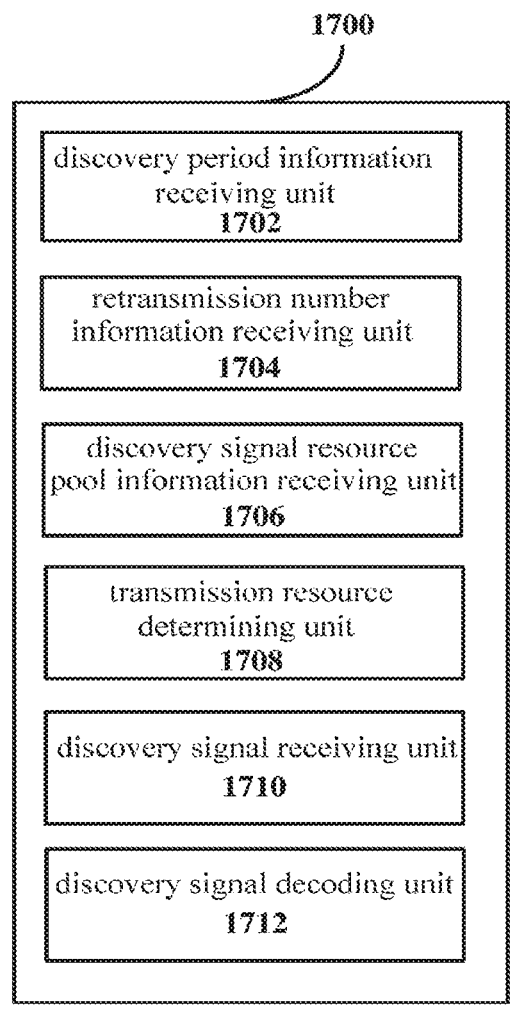
FIG. 17 is a block diagram illustrating an example of function configuration of an apparatus on a receiving user equipment side in the Type1 discovery mechanism according to the third embodiment of the present disclosure.

3-1-3. Examples of Configurations on a Receiving User Equipment Side in the Type1 Discovery Mechanism Next, an example of function configuration of an apparatus on a receiving user equipment side in the Type1 discovery mechanism according to the third embodiment of the present disclosure is described by referring to FIG. 17. FIG. 17 is a block diagram illustrating an example of function configuration of an apparatus on a receiving user equipment side in the Type1 discovery mechanism according to the third embodiment of the present disclosure.

As shown in FIG. 17, an apparatus 1700 may include a discovery period information receiving unit 1702, a retransmission number information receiving unit 1704, a discovery signal resource pool information receiving unit 1706, a transmission resource determining unit 1708, a discovery signal receiving unit 1710 and a discovery signal decoding unit 1712. Examples of function configurations of the discovery period information receiving unit 1702, the retransmission number information receiving unit 1704 and the discovery signal resource pool information receiving unit 1706 are the same as those of the discovery period information receiving unit 1602, the retransmission number information receiving unit 1604 and the discovery signal resource pool information receiving unit 1606 shown in FIG. 16, and are not repeated here. Only examples of function configurations of the transmission resource determining unit 1708, the discovery signal receiving unit 1710 and the discovery signal decoding unit 1712 are described in detail here.

The discovery signal receiving unit 1710 may be configured to listen to a frequency domain range corresponding to the discovery signal resource pool within the discovery period. In a case that the discovery signal is received, the transmission resource determining unit 1708 may be configured to determine, according to time-frequency resources where the discovery signal is located and a predetermined hopping function, time-frequency resources for next transmission of the discovery signal, and thus the discovery signal receiving unit 1710 may receive all discovery signals transmitted from a counterpart user equipment according to the determined time-frequency resources for each transmission of the discovery signal.

The discovery signal decoding unit 1712 may be configured to perform a high layer joint decoding for example on all the received discovery signals to acquire information contained in the discovery signals. For example, the information includes at least an ID of the counterpart user equipment (for example, a radio network temporary identity (RNTI)) and the like. The information may further include a purpose of the D2D communication of the counterpart user equipment and a target communication object and so on for the receiving user equipment to determine whether to perform D2D communication with the counterpart user equipment.

It should be understood that, as described above, each of the discovery period information receiving unit 1702, the retransmission number information receiving unit 1704, the discovery signal resource pool information receiving unit 1706 and the discovery signal receiving unit 1710 here may be implemented by a signal transceiving unit for example, and the transmission resource determining unit 1708 and the discovery signal decoding unit 1712 may be implemented by a control unit for example.

3-2. Scheme Design of Time-Frequency Resource Allocation in a Type 2 (Including Type2A and Type2B) Discovery Mechanism Hereinafter scheme design of time-frequency resource allocation for transmission of a discovery signal in the Type 2 discovery mechanism in D2D communication according to the third embodiment of the present disclosure is descried by referring to FIG. 18.

The Type2 discovery mechanism means that resources for the discovery signal are allocated based on user equipments, and may be divided into two modes, i.e., Type2A and Type2B. Type2A means that resources are independently allocated by the base station or the cluster head during each transmission of the discovery signal in a unified manner, and Type2B means that resources for transmission of the discovery signal are configured in a semi-static manner.

The scheme of time-frequency resource allocation in the Type2A discovery mechanism is similar to the existing manner in which the base station allocates the first transmission resource and the retransmission resources to the user equipments in a unified manner, and will not be repeated here. The transmitting user equipment transmits a discovery signal using time-frequency resources allocated for each transmission of the discovery signal. The receiving user equipment listens to a frequency domain range corresponding to the discovery signal resource pool, calculates, after the discovery signal is received, time-frequency resources where discovery signals to be retransmitted subsequently are located, according to time-frequency resources where the discovery signal is located and in conjunction with a predetermined algorithm, thereby receiving all transmitted discovery signals. It should be understood that in a case of applying the frequency hopping technology, it should be ensured that time-domain resources and frequency-domain resources for each transmission of the discovery signal are different from the time-domain resources and the frequency-domain resources occupied by a last transmission. In the Type2A mechanism, the first transmission resource is allocated to respective user equipments which are going to perform transmission by a centralized management apparatus in a unified manner, and hence a case that multiple transmitting user equipments perform first transmissions using the same time-frequency resources will not occur. Therefore, retransmission frequency-domain resources may be determined by performing frequency hopping in a way similar to that shown in FIG. 2, and in time-domain, time-domain resources corresponding to every other n subframes (n is greater than 0 for example) may be used as retransmission time-domain resources for example. Hereinafter only schemes of time-frequency resource allocation in the Type2B discovery scheme are described in detail.

Firstly, the base station or the central node (for example the cluster head) divides the discovery signal resource pool for transmission of the discovery signal into multiple sub resource pools orthogonal to each other according to the number of user equipments requesting to perform D2D communication (for example each sub resource pool includes resource blocks different from those included in each of other sub resource pools), and allocates the multiple sub resource pools to the user equipments requesting to perform D2D communication respectively. In addition, the number of retransmissions available for each user equipment may also be determined according to the number of all the user equipments. It should be understood that since respective sub resource pools are orthogonal to each other, a possibility that different user equipments select the same time-frequency resource to transmit the discovery signal is avoided. As an exemplary way, the time-domain resources and the frequency-domain resources may be allocated in the following manner, and the present disclosure is not limited thereto.

It is assumed that for any user equipment, a discovery period is P, a retransmission period of the discovery signal is M, the number of available resource blocks for the discovery signal is $N_{RB}^{Dis}$, a time-domain subframe number for first transmission of the discovery signal which is selected randomly by the user equipment is m (m=1, 2, ..., M), and a frequency domain index number is n (n=1, 2, ..., $N_{RB}^{Dis}$). Firstly, first transmission frequency domain resource n is mapped onto the PUSCH resource, for example the following mapping may be performed: f(1)=n/($N_{RB}^{PUSCH}/N_{RB}^{Dis}$). The first transmission time-domain resource t(1)=m.

Frequency-domain resource f(k) and time-domain resource t(k) occupied by the subsequent k-th transmission are respectively indicated as:

$$f(k) = \begin{cases} N_{RB}^{Dis} - f(1), & \text{if } m \bmod 2 = 1 \\ f(1), & \text{if } m \bmod 2 = 0 \end{cases}$$

$$t(k) = \{t(k-1) + [k \times M / \max(re)]\} \bmod M,$$

where k={2, 3, ..., P/M}, and max(re) indicates a supportable maximum number of retransmissions.

In this discovery mechanism, the base station/cluster head notifies the user equipment of information of the divided sub resource pools and retransmission number relevant information (for example, the retransmission period or the number of retransmissions) through dedicated signaling (for example, radio resource control (RRC) signaling). In addition, the dedicated signaling may further include configuration information of the discovery period.

3-2-1. Examples of Configurations on a Base Station Side/Cluster Head Side in the Type2B Discovery Mechanism In the Type2A discovery mechanism, configurations of the base station side/cluster head side, the transmitting user equipment side and the receiving user equipment side are similar to those in the Type1 discovery mechanism. The difference lies in that: in the Type2A discovery mechanism, the resource scheduler 406 and the resource allocation information generating unit 408 in the single-cell communication mode of mode1 for example are needed to be provided on the base station side to allocate transmission resources for transmission of the discovery signal (including at least first transmission resource, and may further include retransmission resources) and generate indication information of the transmission resources, and transmit the indication information of the transmission resources to the transmitting user equipment via the transmitting unit; and the transmitting user equipment side does not need to select first transmission resource for the discovery signal, but needs to provide a corresponding resource receiving unit to receive the transmission resources allocated by the base station or the cluster head. Other contents which are not described in detail may be referred to corresponding descriptions for the Type1 discovery mechanism, and are not repeated here.

Figure 18:
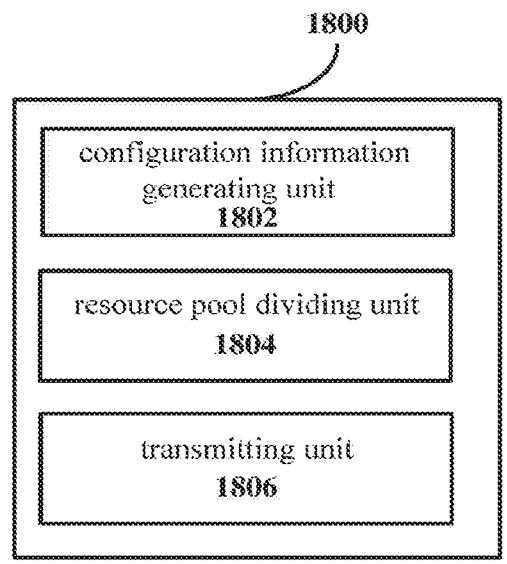
FIG. 18 is a block diagram illustrating an example of function configuration of an apparatus on a base station side/cluster head side in a Type2B discovery mechanism according to the third embodiment of the present disclosure.

Next an example of function configuration of an apparatus on a base station side/cluster head side in the Type2B discovery mechanism according to the third embodiment of the present disclosure is described by referring to FIG. 18. FIG. 18 is a block diagram illustrating an example of function configuration of an apparatus on a base station side/cluster head side in the Type2B discovery mechanism according to the third embodiment of the present disclosure.

As shown in FIG. 18, an apparatus 1800 may include a configuration information generating unit 1802, a resource pool dividing unit 1804 and a transmitting unit 1806.

The configuration information generating unit 1802 may be configured to generate configuration information including retransmission number relevant information and discovery period information.

The resource pool dividing unit 1804 may be configured to divide a preconfigured discovery signal resource pool into multiple sub resource pools orthogonal to each other according to the number of user equipments requesting to perform D2D communication.

The transmitting unit 1806 may be configured to transmit the configuration information and information of the sub resource pools to corresponding user equipments through dedicated signaling (for example RRC signaling). Alternatively, in a case that the discovery signal resource pool is configured on the base station side/cluster head side, the transmitting unit 1806 may transmit the information of the discovery signal resource pool to respective user equipments by broadcasting.

3-2-2. Examples of Configurations on a User Equipment Side in the Type2B Discovery Mechanism In the Type2B discovery mechanism, function configuration of an apparatus on the user equipment side (including the transmitting user equipment side and the receiving user equipment side) is similar to the function configuration in the Type1 discovery mechanism, and the difference mainly lies in that, the transmission resource determining unit determines retransmission resources according to an algorithm/hopping function different from that in the Type1 discovery mechanism. In addition, the transmitting user equipment may further include a sub resource pool information receiving unit configured to receive information of a sub resource pool, which is allocated by the base station side/cluster head side for the user equipment to transmit the discovery signal The sub resource pools for respective user equipments are orthogonal to each other. Hence, the transmitting user equipment randomly selects first transmission resource for the discovery signal from its allocated sub resource pool, determines retransmission resources according to a predetermined algorithm, and repeatedly transmits the discovery signal to a counterpart user equipment using the determined first transmission resource and retransmission resources. It should be understood that the discovery signal resource pool information receiving unit in the Type1 discovery mechanism may be multiplexed to receive the information of the sub resource pools, and the only difference is the content of the received resource pool. After receiving the discovery signal for the first time, the receiving user equipment calculates, according to the time-frequency resources where the discovery signal is located, time-frequency resources where the discovery signals to be retransmitted subsequently are located, based on a predetermined algorithm in the Type2B discovery mechanism, and receives all transmitted discovery signals by listens to the calculated subsequent time-frequency resources.

4. Fourth Embodiment

In D2D communication, in some examples of the present disclosure, it may be also designed that the scheduling assignment information transmitted from the transmitting user equipment to the receiving user equipment is retransmitted and retransmission frequency hopping is also supported, but it is not necessary to notify the receiving user equipment of specific transmission resource information and whether to perform frequency hopping (for example, the frequency hopping is performed by default). A frequency hopping scheme for the scheduling assignment information is similar to the frequency hopping scheme for data signals, and is not repeated here.

Specifically, the transmitting user equipment may repeatedly transmit, according to the received retransmission number relevant information, the scheduling assignment information to the receiving user equipment using the first transmission resource and the retransmission resources selected in a preconfigured scheduling assignment information resource pool (for example, configured in a semi-static manner or statically through RRC signaling). Accordingly, the receiving user equipment may perform, according to the received retransmission number relevant information, listening in a frequency range corresponding to the preconfigured scheduling assignment information resource pool for all scheduling assignment information from the transmitting user equipment. That is, the receiving user equipment searches for (i.e., blindly detects) the preconfigured scheduling assignment information resource pool and receives the scheduling assignment information transmitted each time. For example, the receiving user equipment may detect all the scheduling assignment information transmitted thereto according to RNTI included in a signal carrying the scheduling assignment information, for example.

Although examples of the function configurations of the apparatus embodiments have been described above by way of an example, it should be understood that those skilled in the art may make modifications, combinations, additions and/or deletions according to the principles of the present disclosure, and all of these variations are considered to fall within the scope of the present disclosure.

Corresponding to the above apparatus embodiments, method embodiments are further provided according to the present disclosure.

Figure 19:
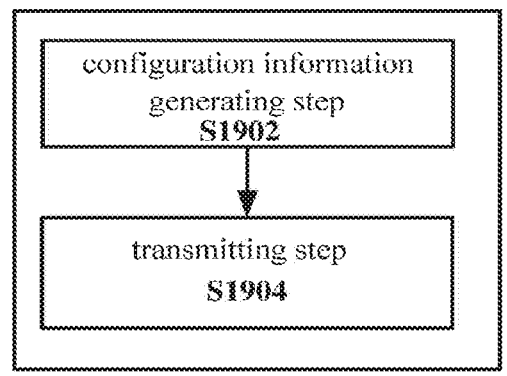
FIG. 19 is a flowchart illustrating an exemplary process of a method in a wireless communication system according to an embodiment of the present disclosure.

FIG. 19 is a flowchart illustrating an exemplary process of a method in a wireless communication system according to an embodiment of the present disclosure.

As shown in FIG. 19, the method includes a configuration information generating step S1902 and a transmitting step S1904.

In the configuration information generating step S1902, configuration information for user equipments performing device to device communication including retransmission number relevant information is generated. The retransmission number relevant information indicates information relevant to the number of retransmissions of signal transmission between the user equipments performing device to device communication.

In the transmitting step S1904, the generated configuration information is transmitted to the user equipment performing device to device communication.

Figure 20:
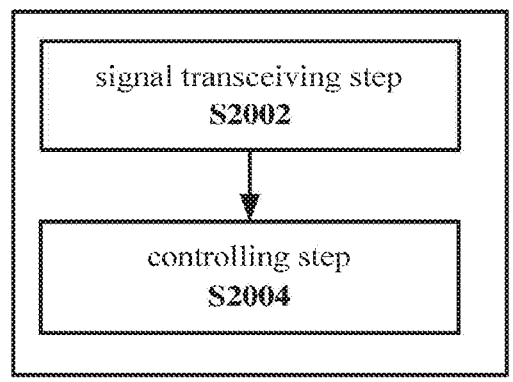
FIG. 20 is a flowchart illustrating an exemplary process of a method in a wireless communication system according to another embodiment of the present disclosure.

FIG. 20 is a flowchart illustrating an exemplary process of a method in a wireless communication system according to another embodiment of the present disclosure.

As shown in FIG. 20, the method may include a signal transceiving step S2002 and a controlling step S2004.

In the signal transceiving step S2002, configuration information including retransmission number relevant information is received. The retransmission number relevant information indicates information relevant to the number of retransmissions of signal transmission between user equipments performing device to device communication.

In the controlling step S2004, it is controlled, according to the received retransmission number relevant information, to repeatedly transmit a signal to a counterpart user equipment in the signal transceiving step S2002. It should be understood that the signal here includes at least one of a data signal, a discovery signal and scheduling assignment information.

Figure 21:
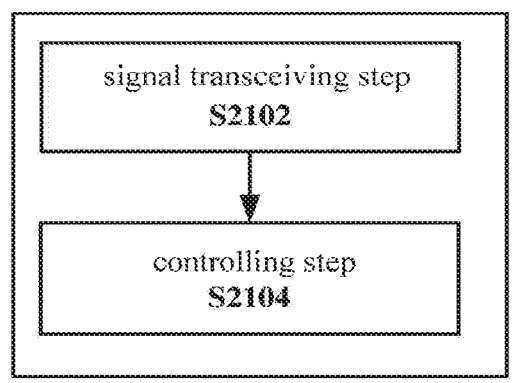
FIG. 21 is a flowchart illustrating an exemplary process of a method in a wireless communication system according to another embodiment of the present disclosure.

FIG. 21 is a flowchart illustrating an exemplary process of a method in a wireless communication system according to another embodiment of the present disclosure.

As shown in FIG. 21, the method may include a signal transceiving step S2102 and a controlling step S2104.

In the signal transceiving step S2102, configuration information including retransmission number relevant information is received. The retransmission number relevant information indicates information relevant to the number of retransmissions of signal transmission between user equipments performing device to device communication.

In the controlling step S2104, it is controlled, according to the received retransmission number relevant information, to receive all signals transmitted by a counterpart user equipment in the signal transceiving step S2002.

It should be noted that the method embodiments here correspond to the apparatus embodiments described above, hence the contents which are not described in detail in the method embodiments may be referred to corresponding descriptions in the apparatus embodiments, and are not repeated here.

It should be understood that machine executable instructions in a storage medium and a program product according to an embodiment of the present disclosure may be configured to perform the methods corresponding to the apparatus embodiments, and hence the contents which are not described in detail here may be referred to corresponding descriptions above, and are not repeated here.

Accordingly, a storage medium on which the above program product storing machine executable instructions is carried is also included in the disclosure of the invention. The storage medium includes but not limited to a floppy disk, an optical disk, a magneto-optical disk, a storage card, a memory rod and the like.

Furthermore, it shall be noted that the foregoing series of processes and devices can also be embodied in software and/or firmware. In the case of being embodied in software and/or firmware, a program constituting the software is installed from a storage medium or a network to a computer with a dedicated hardware structure, e.g., a general purpose personal computer 2200 illustrated in FIG. 22, which can perform various functions when various programs are installed thereon.

Figure 22:
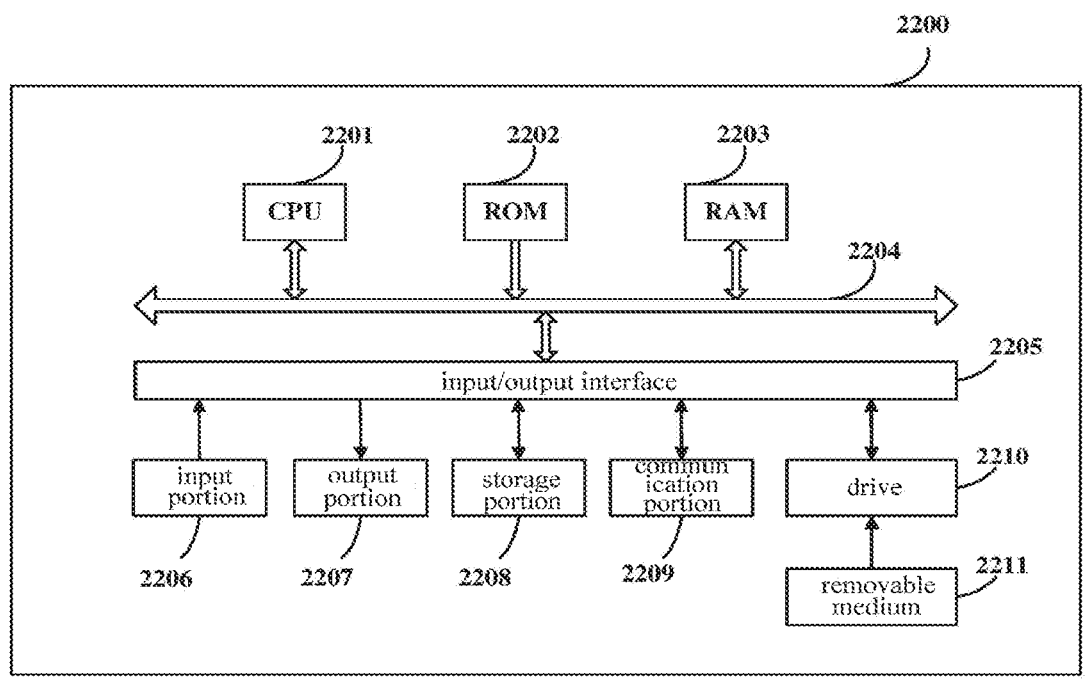
FIG. 22 is a block diagram of an exemplary structure of a personal computer as an available information processing device according to an embodiment of the present disclosure.

In FIG. 22, a Central Processing Unit (CPU) 2201 performs various processes according to a program stored in a Read Only Memory (ROM) 2202 or loaded from a storage portion 2208 into a Random Access Memory (RAM) 2203 in which data required when the CPU 2201 performs the various processes is also stored as needed.

The CPU 2201, the ROM 2202 and the RAM 2203 are connected to each other via a bus 2204 to which an input/output interface 2205 is also connected.

The following components are connected to the input/output interface 2205: an input portion 2206 including a keyboard, a mouse, etc.; an output portion 2207 including a display, e.g., a Cathode Ray Tube (CRT), a Liquid Crystal Display (LCD), etc., a speaker, etc.; a storage portion 2208 including a hard disk, etc.; and a communication portion 2209 including a network interface card, e.g., an LAN card, a modem, etc. The communication portion 2209 performs a communication process over a network, e.g., the Internet.

A drive 2210 is also connected to the input/output interface 2205 as needed. A removable medium 2211, e.g., a magnetic disk, an optical disk, a magneto optical disk, a semiconductor memory, etc., can be installed on the drive 2210 as needed so that a computer program fetched therefrom can be installed into the storage portion 2208 as needed.

In the case that the foregoing series of processes are performed in software, a program constituting the software is installed from a network, e.g., the Internet, etc., or a storage medium, e.g., the removable medium 2211, etc.

Those skilled in the art shall appreciate that such a storage medium will not be limited to the removable medium 2211 illustrated in FIG. 22 in which the program is stored and which is distributed separately from the apparatus to provide a user with the program. Examples of the removable medium 2211 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 2202, a hard disk included in the storage portion 2208, etc., in which the program is stored and which is distributed together with the apparatus including the same to the user.

5. Application Examples

The technology of the present disclosure is applicable to various products.

For example, a base station may be realized as any type of evolved Node B (eNB), such as a macro eNB and a small eNB. The small eNB may be an eNB such as a pico eNB, a micro eNB and a home (femto) eNB which covers a cell smaller than a macro cell. Alternatively, the base station may be realized as any other types of base stations, such as a NodeB and a base transceiver station (BTS). The base station may include: a main body (that is also referred to as a base station apparatus) configured to control radio communication; and one or more remote radio heads (RRH) disposed in a different place from the main body. In addition, various types of terminals, which will be described below, may each operate as a base station by temporarily or a semi-persistently executing a base station function.

For example, the user equipment may be realized as a mobile terminal (such as a smartphone, a tablet personal computer (PC), a notebook PC, a portable game terminal, a portable/dongle type mobile router and a digital camera) or an in-vehicle terminal (such as a car navigation apparatus). The terminal apparatus may also be realized as a terminal (that is also referred to as a machine type communication (MTC) terminal) that performs machine-to-machine (M2M) communication. In addition, the user equipment may be a radio communication module (such as an integrated circuit module including a single die) installed on each of the terminals.

5-1. Application Example Regarding Base Station

First Application Example

Figure 23:
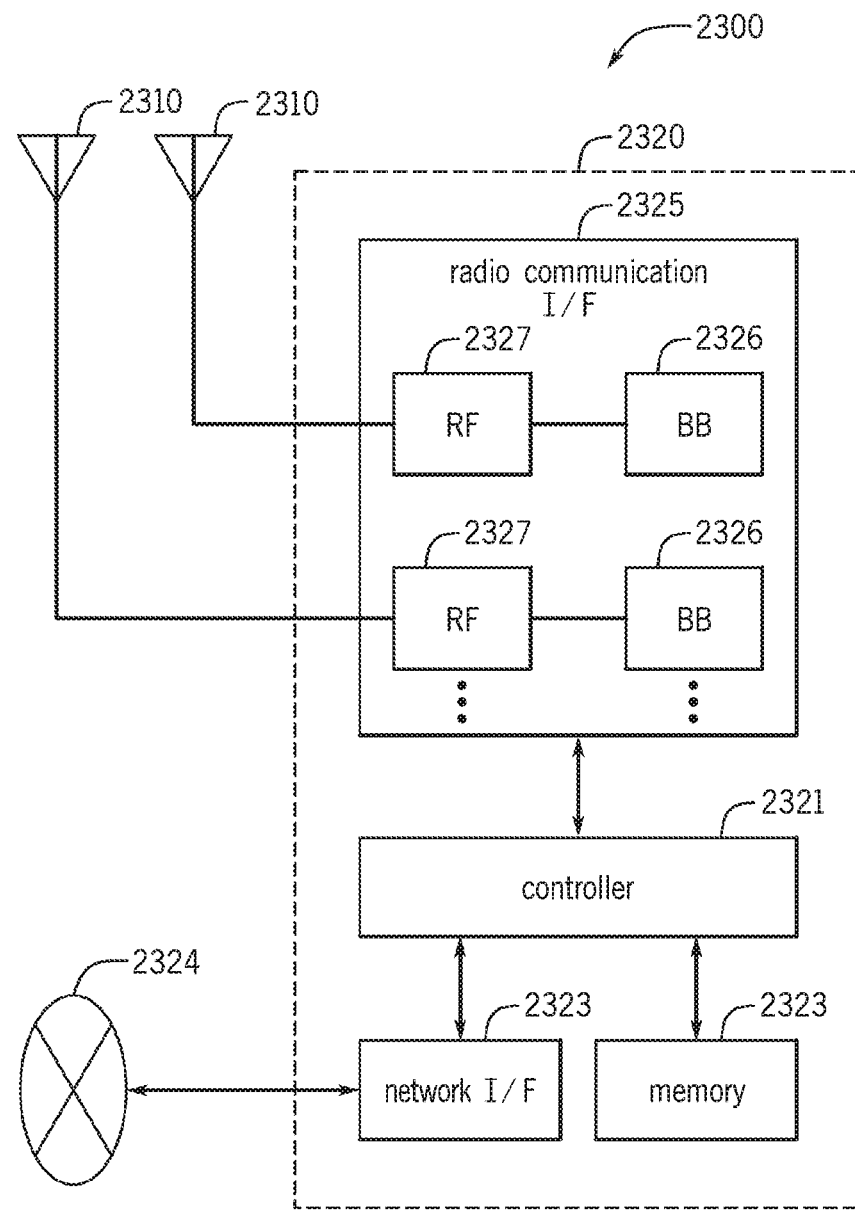
FIG. 23 is a block diagram illustrating a first example of schematic configuration of an evolved node B (eNB) to which the technology of the present disclosure may be applied.

FIG. 23 is a block diagram illustrating a first example of exemplary configuration of an eNB to which the technology of the content of the present disclosure may be applied. An eNB 2300 includes one or more antennas 2310 and a base station apparatus 2320. The base station apparatus 2320 and each antenna 2310 may be connected to each other via an RF cable.

Each of the antennas 2310 includes a single or multiple antenna elements (such as multiple antenna elements included in a multiple input multiple output (MIMO) antenna), and is used for the base station apparatus 2320 to transmit and receive radio signal. As shown in FIG. 23, the eNB 2300 may include multiple antennas 2310. For example, the multiple antennas 2310 may be compatible with multiple frequency bands used by the eNB 2300. Although FIG. 23 illustrates the example in which the eNB 2300 includes the multiple antennas 2310, the eNB 2300 may also include a single antenna 2310.

The base station apparatus 2310 includes a controller 2321, a memory 2322, a network interface 2323 and a radio communication interface 2325.

The controller 2321 may be, for example, a CPU or a DSP, and operates various functions of a higher layer of the base station apparatus 2320. For example, the controller 2321 generates a data packet from data in signals processed by the radio communication interface 2325, and transfers the generated packets via the network interface 2323. The controller 2321 may bundle data from multiple base band processors to generate the bundled packet, and transfer the generated bundled packet. The controller 2321 may have logic functions of performing control such as radio resource control, radio bearer control, mobility management, admission control and scheduling. The control may be performed in corporation with an eNB or a core network node in the vicinity. The memory 2322 includes RAM and ROM, and stores a program that is executed by the controller 2321 and various types of control data (such as a terminal list, transmission power data and scheduling data).

The network interface 2323 is a communication interface for connecting the base station apparatus 2320 to a core network 2324. The controller 2321 may communicate with a core network node or another eNB via the network interface 2323. In this case, the eNB 2300 and the core network node or other eNB may be connected to each other through a logical interface (such that an Si interface or an X2 interface). The network interface 2323 may also be a wired communication interface or a radio communication interface for radio backhaul. If the network interface 2323 is a radio communication interface, the network interface 2323 may use a higher frequency band for radio communication than a frequency band used by the radio communication interface 2325.

The radio communication interface 2325 supports any cellular communication scheme (such as a long term evolution (LTE) and LTE-Advanced), and provides radio connection to a terminal positioned in a cell of the eNB 2300 via the antenna 2310. The radio communication interface 2325 may typically include, for example, a baseband (BB) processor 2326 and an RF circuit 2327. The BB processor 2326 may perform, for example, encoding/decoding, modulating/demodulating and multiplexing/demultiplexing, and performs various types of signal processing of layers (such as L1, medium access control (MAC), radio link control (RLC) and a packet data convergence protocol (PDCP)). The BB processor 2326 may have a part or all of the above-described logic functions instead of the controller 2321. The BB processor 2326 may be a memory that stores a communication control program, or a module that includes a processor and a relevant circuit configured to execute the program. Updating the program may allow the functions of the BB processor 2326 to be changed. The module may be a card or blade that is inserted into a slot of the base station apparatus 2320. Alternatively, the module may also be a chip that is installed on the card or the blade. Meanwhile, the RF circuit 2327 may include, for example, a mixer, a filter and an amplifier, and transmits and receives radio signals via the antenna 2310.

As illustrated in FIG. 23, the radio communication interface 2325 may include multiple BB processors 2326. For example, the multiple BB processors 2326 may be compatible with multiple frequency bands used by the eNB 2300. As illustrated in FIG. 23, the radio communication interface 2325 may include multiple RF circuits 2327. For example, multiple RF circuits 2327 may be compatible with multiple antenna elements. Although FIG. 23 illustrates the example in which the radio communication interface 2325 includes the multiple BB processors 2326 and the multiple RF circuits 2327, the radio communication interface 2325 may also include a single BB processor 2326 or a single RF circuit 2327.

Second Application Example

Figure 24:
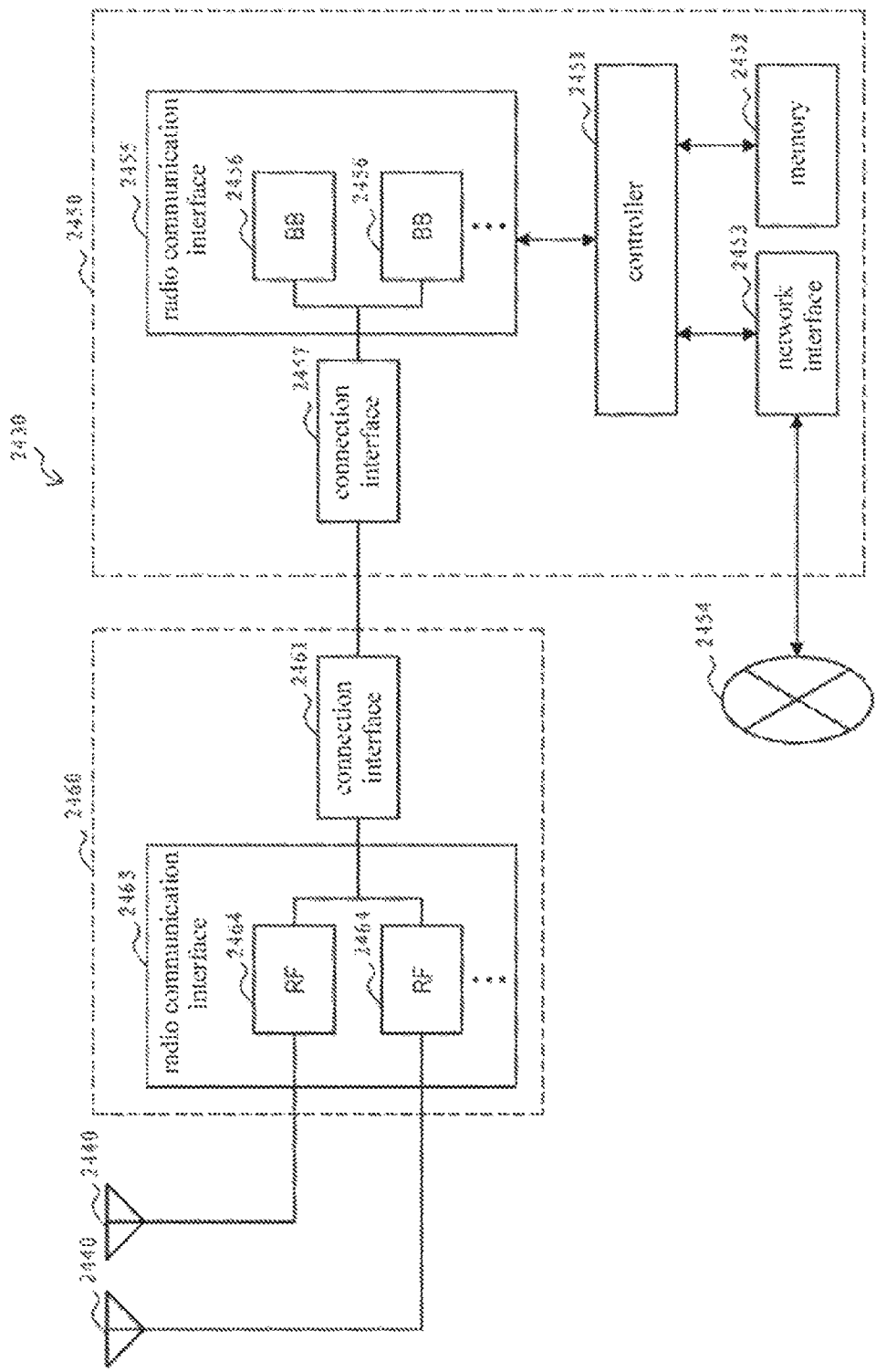
FIG. 24 is a block diagram illustrating a second example of schematic configuration of the eNB to which the technology of the present disclosure may be applied.

FIG. 24 is a block diagram illustrating a second example of an exemplary configuration of an eNB to which the technology of the present disclosure may be applied. An eNB 2430 includes one or more antennas 2440, a base station apparatus 2450 and an RRH 2460. The RRH 2460 and each antenna 2440 may be connected to each other via an RF cable. The base station 2450 and the RRH 2460 may be connected to each other via a high speed line such as an optical fiber cable.

Each of the antennas 2440 includes a single or multiple antenna elements (such as multiple antenna elements included in a MIMO antenna), and is used for the RRH 2460 to transmit and receive radio signals. As illustrated in FIG. 24, the eNB 2430 may include multiple antennas 2440. For example, the multiple antennas 2440 may be compatible with multiple frequency bands used by the eNB 2430. Although FIG. 24 illustrates the example in which the eNB 2430 includes the multiple antennas 2440, the eNB 2430 may also include a single antenna 2440.

The base station apparatus 2450 includes a controller 2451, a memory 2452, a network interface 2453, a radio communication interface 2455 and a connection interface 2457. The controller 2451, the memory 2452 and the network interface 2453 are the same as the controller 2321, the memory 2322 and the network interface 2323 described with reference to FIG. 23.

The radio communication interface 2455 support any cellular communication scheme (such as LTE and LTE-Advanced), and provides radio communication to a terminal positioned in a sector corresponding to the RRH 2460 via the RRH 2460 and the antenna 2440. The radio communication interface 2455 may typically include, for example a BB processor 2456. The BB processor 2456 is the same as the BB processor 2326 described with reference to FIG. 23, except the BB processor 2456 is connected to the RF circuit 2464 of the RRH 2460 via the connection interface 2457. As illustrated in FIG. 24, the radio communication interface 2455 may include multiple BB processors 2456. For example, the multiple BB processors 2456 may be compatible with multiple frequency bands used by the eNB 2430. Although FIG. 24 shows the example in which the radio communication interface 2455 includes the multiple processors 2456, the radio communication interface 2455 may also include a single BB processor 2456.

The connection interface 2457 is an interface for connecting the base station apparatus 2450 (the radio communication interface 2455) to the RRH 2460. The connection interface 2457 may also be a communication module for communication in the above-described high speed line that connects the base station apparatus 2450 (the radio communication interface 2455) to the RRH 2460.

The RRH 2460 includes a connection interface 2461 and a radio communication interface 2463.

The connection interface 2461 is an interface for connecting the RRH 2460 (the radio communication interface 2463) to the base station apparatus 2450. The connection interface 2461 may also be a communication module for communication in the above-described high speed line.

The radio communication interface 2463 transmits and receives radio signals via the antenna 2440. The radio communication interface 2463 may typically include, for example, an RF circuit 2464. The RF circuit 2464 may include, for example, a mixer, a filter and an amplifier, and transmits and receives radio signals via the antenna 2440. As illustrated in FIG. 24, the radio communication interface 2463 may include multiple RF circuits 2464. For example, multiple RF circuits 2464 may support multiple antenna elements. Although FIG. 24 illustrates the example in which the radio communication interface 2463 includes the multiple RF circuits 2464, the radio communication interface 2463 may also include a single RF circuit 2464.

In the eNB 2300 and the eNB 2430 shown in FIG. 23 and FIG. 24, units relevant to the transmission function included in the apparatus on the base station side/cluster head side, for example, various types of information transmitting units and information receiving units, may be implemented by the radio communication interface 2325 and the radio communication interface 2455 and/or the radio communication interface 2463. At least a part of the functions may also be implemented by the controller 2321 and the controller 2451. In addition, units relevant to control and processing functions, for example, control units (the resource scheduler and various types of information generating units and so on), in the apparatus on the base station apparatus side, may be implemented by the controller 2321 and the controller 2451.

5-2. Application Examples Regarding User Equipment

First Application Example

Figure 25:
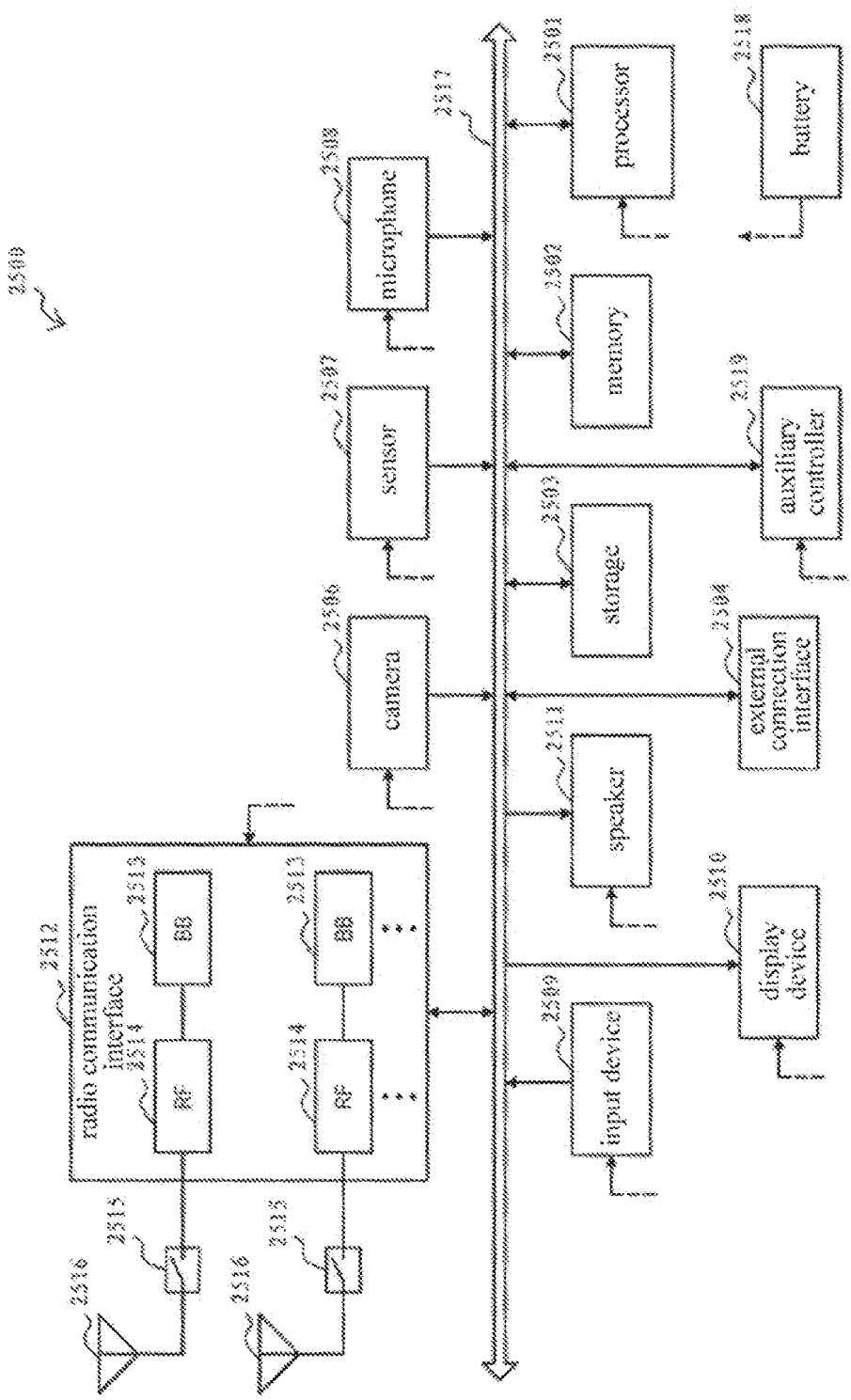
FIG. 25 is a block diagram illustrating an example of schematic configuration of a smartphone to which the technology of the present disclosure may be applied.

FIG. 25 is a block diagram illustrating an example of exemplary configuration of a smartphone 2500 to which the technology of the present disclosure may be applied. The smartphone 2500 includes a processor 2501, a memory 2502, a storage 2503, an external connection interface 2504, a camera 2506, a sensor 2507, a microphone 2508, an input device 2509, a display device 2510, a speaker 2511, a radio communication interface 2512, one or more antenna switches 2515, one or more antennas 2516, a bus 2517, a battery 2518 and an auxiliary controller 2519.

The processor 2501 may be, for example, a CPU or a system on chip (SoC), and controls functions of an application layer and another layer of the smartphone 2500. The memory 2502 includes RAM and ROM, and stores a program that is executed by the processor 2501, and data. The storage 2503 may include a storage medium, such as a semiconductor memory and a hard disk. The external connection interface 2504 is an interface for connecting an external device such as a memory card or a universal serial bus (USB) device to the smartphone 2500.

The camera 2506 includes an image sensor (such as a charge coupled apparatus (CCD) and a complementary metal oxide conductor (CMOS)), and generates a captured image. The sensor 2507 may include a group of sensors, such as a measurement sensor, a gyro sensor, a geomagnetic sensor and an acceleration sensor. The microphone 2508 converts sounds that are input to the smartphone 2500 to audio signals. The input device 2509 includes, for example, a touch sensor configured to detect touch onto a screen of the display device 2510, a keypad, a keyboard, a button or a switch, and receives an operation or information input from a user. The display device 2510 includes a screen (such as a liquid crystal display (LCD) and an organic light-emitting diode (OLED) display), and displays an output image of the smartphone 2500. The speaker 2511 converts audio signals that are output from the smartphone 2500 to sounds.

The radio communication interface 2512 supports any cellular communication scheme (such as LTE and LTE-Advanced), and performs radio communication. The radio communication interface 2512 may typically include, for example, a BB processor 2513 and an RF circuit 2514. The BB processor 2513 may perform, for example, encoding/decoding, modulating/demodulating and multiplexing/demultiplexing, and performs various types of signal processing for radio communication. Meanwhile, The RF circuit 2514 may include, for example, a mixer, a filter and an amplifier, and transmits and receives radio signals via the antenna 2516. The radio communication interface 2512 may be one chip module having the BB processor 2513 and the RF circuit 2514 integrated thereon. As illustrated in FIG. 25, the radio communication interface 2512 may include multiple BB processors 2513 and multiple RF circuits 2514. Although FIG. 25 illustrates the example in which the radio communication interface 2512 includes the multiple BB processors 2513 and the multiple RF circuits 2514, the radio communication interface 2512 may also include a single BB processor 2513 or a single RF circuit 2514.

Furthermore, in addition to the cellular communication scheme, the radio communication interface 2512 may support another type of radio communication scheme, such as a short-distance radio communication scheme, a near field communication scheme and a wireless local area network (LAN) scheme. In this case, the radio communication interface 2512 may include the BB processor 2513 and the RF circuit 2514 for each radio communication scheme.

Each of the antenna switches 2515 switches connection destinations of the antennas 2516 among multiple circuits (such as circuits for different radio communication schemes) included in the radio communication interface 2512.

Each of the antennas 2516 includes a single or multiple antenna elements (such as multiple antenna elements included in a MIMO antenna), and is used for the radio communication interface 2512 to transmit and receive radio signals. As illustrated in FIG. 25, the smartphone 2500 may include multiple antennas 2516. Although FIG. 25 illustrates the example in which the smartphone 2500 includes the multiple antennas 2516, the smartphone 2500 may also include a single antenna 2516.

Furthermore, the smartphone 2500 may include antennas 2516 for each radio communication scheme. In that case, the antenna switches 2515 may be omitted from the configuration of the smartphone 2500.

The bus 2517 connects the processor 2501, the memory 2502, the storage 2503, the external connection interface 2504, the camera 2506, the sensor 2507, the microphone 2508, the input device 2509, the display device 2510, the speaker 2511, the radio communication interface 2512 and the auxiliary controller 2519 to each other. The battery 2518 supplies power to blocks of the smartphone 2500 illustrated in FIG. 25 via feeder lines, which are partially shown as dashed lines in FIG. 25. The auxiliary controller 2519 operates a minimum necessary function of the smartphone 2500, for example, in a sleep mode.

In the smartphone 2500 illustrated in FIG. 25, units relevant to the signal transceiving function, for example, a signal transceiving unit (a receiving unit and a transmitting unit and so on), in the apparatus on the user equipment side may be implemented by the radio communication interface 2512. At least a part of the functions may also be implemented by the processor 2501 or the auxiliary controller 2519. In addition, units relevant to control and processing functions, for example, control units (a resource determining unit, a resource selecting unit, an encoding and decoding unit and an information generating unit and so on), in the apparatus on the user equipment side, may be implemented by the processor 2501 or the auxiliary controller 2519.

Second Application Example

Figure 26:
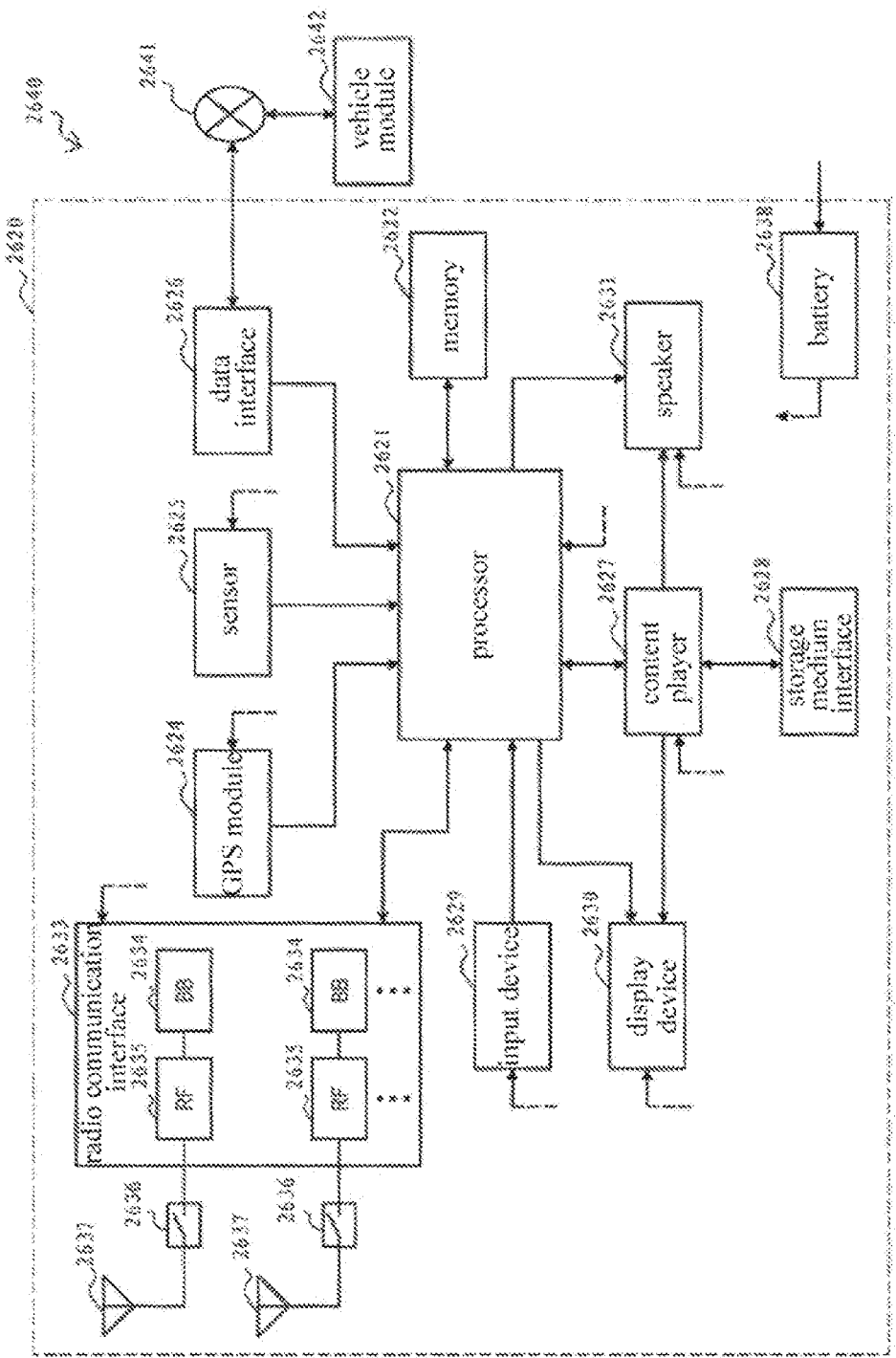
FIG. 26 is a block diagram illustrating an example of schematic configuration of a car navigation apparatus to which the technology of the present disclosure may be applied.

FIG. 26 is a block diagram illustrating an example of exemplary configuration of a car navigation apparatus 2620 to which the technology of the present disclosure may be applied. The car navigation apparatus 2620 includes a processor 2621, a memory 2622, a global positioning system (GPS) module 2624, a sensor 2625, a data interface 2626, a content player 2627, a storage medium interface 2628, an input device 2629, a display device 2630, a speaker 2631, a radio communication interface 2633, one or more antenna switches 2636, one or more antennas 2637 and a battery 2638.

The processor 2621 may be, for example, a CPU or a SoC, and controls a navigation function and another function of the car navigation apparatus 2620. The memory 2622 includes RAM and ROM, and store a program that is executed by the processor 2621, and data.

The GPS module 2624 uses GPS signals received from a GPS satellite to measure a position (such as latitude, longitude and altitude) of the car navigation apparatus 2620. The sensor 2625 may include a group of sensors, such as a gyro sensor, a geomagnetic sensor and an air pressure sensor. The data interface 2626 is connected to, for example, an in-vehicle network 2641 via a terminal that is not shown, and acquires data generated by a vehicle (such as vehicle speed data).

The content player 2627 reproduces content stored in a storage medium (such as a CD and a DVD) that is inserted into the storage medium interface 2628. The input device 2629 includes, for example, a touch sensor configured to detect touch onto a screen of the display device 2630, a button or a switch, and receives an operation or information input from a user. The display device 2630 includes a screen such as an LCD or an OLED display, and displays an image of the navigation function or content that is reproduced. The speaker 2631 outputs sounds of the navigation function or the content that is reproduced.

The radio communication interface 2633 supports any cellular communication scheme (such as LTE and LTE-Advanced), and performs radio communication. The radio communication interface 2633 may typically include, for example, a BB processor 2634 and an RF circuit 2635. The BB processor 2634 may perform, for example, encoding/decoding, modulating/demodulating and multiplexing/demultiplexing, and performs various types of signal processing for radio communication. Meanwhile, The RF circuit 2635 may include, for example, a mixer, a filter and an amplifier, and transmits and receives radio signals via the antenna 2637. The radio communication interface 2633 may also be one chip module that has the BB processor 2634 and the RF circuit 2635 integrated thereon. As illustrated in FIG. 26, the radio communication interface 2633 may include multiple BB processors 2634 and multiple RF circuits 2635. Although FIG. 26 shows the example in which the radio communication interface 2633 includes the multiple BB processors 2634 and the multiple RF circuits 2635, the radio communication interface 2633 may also include a single BB processor 2634 or a single RF circuit 2635.

Furthermore, in addition to a cellular communication scheme, the radio communication interface 2633 may support another type of radio communication scheme, such as a short-distance radio communication scheme, a near field communication scheme and a wireless LAN scheme. In this case, the radio communication interface 2633 may include the BB processor 2634 and the RF circuit 2635 for each radio communication scheme.

Each of the antenna switches 2636 switches connection destinations of the antenna 2637 among multiple circuits (such as circuits for different radio communication schemes) included in the radio communication interface 2633.

Each of the antennas 2637 includes a single or multiple antenna elements (such as multiple antenna elements included in a MIMO antenna), and is used for the radio communication interface 2633 to transmit and receive radio signals. As illustrated in FIG. 26, the car navigation apparatus 2620 may include the multiple antennas 2637. Although FIG. 26 illustrates the example in which the car navigation apparatus 2620 includes the multiple antennas 2637, the car navigation apparatus 2620 may include a single antenna 2637.

Furthermore, the car navigation apparatus 2620 may include the antenna 2637 for each radio communication scheme. In that case, the antenna switches 2636 may be omitted from the configuration of the car navigation apparatus 2620.

A battery 2638 supplies power to blocks of the car navigation apparatus 2620 shown in FIG. 26 via feeder lines that are partially shown as dashed lines in FIG. 26. The battery 2638 accumulates power supplied from the vehicle.

In the car navigation apparatus 2620 illustrated in FIG. 26, units relevant to the signal transceiving function, for example the signal transceiving unit (a receiving unit and a transmitting unit and so on), in the apparatus on the user equipment side, may be implemented by the radio communication interface 2633. At least a part of the functions may also be implemented by the processor 2621. In addition, units relevant to control and processing functions, for example, control units (a resource determining unit, a resource selecting unit, an encoding and decoding unit, an information generating unit and so on), in the apparatus on the user equipment side, may be implemented by the processor 2621.

The technology of the present disclosure may also be realized as an in-vehicle system (or a vehicle) 2640 including one or more blocks of the car navigation apparatus 2620, the in-vehicle network 2641 and a vehicle module 2642. The vehicle module 2642 generates vehicle data such as a vehicle speed, an engine speed and trouble information, and outputs the generated data to the in-vehicle network 2641.

Preferred embodiments of the disclosure have been described above with reference to the drawings, but the disclosure is not limited to the above examples of course. Those skilled in the art may devise various alternations and modifications within the scope of the appended claims, and it should be understood that these alternations and modifications would naturally fall within the technical scope of the disclosure.

For example, multiple functions included in one unit in the above embodiments may be implemented by separated apparatuses. Alternatively, multiple functions implemented by multiple units in the above embodiments may be implemented by separated apparatuses respectively. Furthermore, one of the above functions may be implemented by multiple units. Without saying, such configuration is included in the technical scope of the disclosure.

In this specification, the steps described in the flow charts include not only processes performed in the sequential order as described chronically, but also processes performed concurrently or separately but not necessarily chronically. Further, even in the steps processed chronically, without saying, the order can be appropriately changed.

In addition, the present disclosure may be also configured as follows.

1. An apparatus in a wireless communication system, the apparatus comprising:
a configuration information generating unit configured to generate configuration information for a user equipment performing device to device communication, the configuration information comprising retransmission number relevant information, wherein the retransmission number relevant information indicates information relevant to the number of retransmissions of signal transmission between user equipments performing device to device communication; and
a transmitting unit configured to transmit the generated configuration information to the user equipment performing device to device communication.

2. The apparatus according to Item 1, wherein the apparatus further comprises a system information generating unit configured to comprise the configuration information in a system information block, and the transmitting unit is configured to transmit the system information block to the user equipment performing device to device communication.

3. The apparatus according to Item 1 or 2, further comprising:
a resource scheduler configured to allocate transmission resources for signal transmission of the user equipment performing device to device communication, wherein the transmitting unit is further configured to transmit indication information of the transmission resources to a transmitting user equipment performing device to device communication, and the transmission resources comprise first transmission resource for first signal transmission of the user equipment performing device to device communication.

4. The apparatus according to Item 3, further comprising:
a resource allocation information generating unit configured to generate downlink control information or random access response information comprising the indication information of the transmission resources, wherein the transmitting unit is further configured to transmit the downlink control information or the random access response information to the transmitting user equipment performing device to device communication via a corresponding channel to indicate the transmission resources for device to device communication, and the resource allocation information generating unit comprises indication information of the first transmission resource in the downlink control information or the random access response information.

5. The apparatus according to Item 4, wherein the indication information of the transmission resources corresponds to uplink grant information carried by downlink control information format 0.

6. The apparatus according to any one of Items 3 to 5, wherein the resource scheduler allocates resources close to a physical uplink control channel in an uplink channel to the user equipment performing device to device communication as the transmission resources.

7. The apparatus according to Item 3, wherein the transmission resources allocated by the resource scheduler further comprise retransmission resources for signal retransmission of the user equipment performing device to device communication, and a frequency span between each of the retransmission resources and a last transmission resource satisfies a predetermined condition.

8. The apparatus according to Item 6, wherein the resource scheduler determines a closeness degree of the transmission resources for device to device communication to the physical uplink control channel according to a distance from the user equipment performing device to device communication to a base station.

9. The apparatus according to Item 2, wherein the system information generating unit further comprises configuration information of a resource pool for signal transmission in device to device communication in the system information block.

10. The apparatus according to Item 1 or 2, wherein the configuration information generating unit is further configured to comprise, a retransmission frequency hopping indication flag indicating whether to apply frequency hopping technology to signal retransmission in device to device communication, in the configuration information, and in a case that the frequency hopping technology is to be applied, frequencies of each of the retransmission resources for signal retransmission and a last transmission resource are at least different.

11. The apparatus according to any one of Items 3 to 8, wherein the resource scheduler is further configured to determine whether to apply frequency hopping technology to signal retransmission in device to device communication to allocate the transmission resources to the user equipment performing device to device communication, and the transmitting unit is further configured to transmit, to the transmitting user equipment performing device to device communication, the indication information of the transmission resources comprising a retransmission frequency hopping indication flag indicating whether to apply the frequency hopping technology, and in a case that the frequency hopping technology is to be applied, frequencies of each of the retransmission resources for signal retransmission and a last transmission resource are at least different.

12. The apparatus according to Item 3, further comprising:
a cell bandwidth configuration information acquiring unit configured to acquire cell bandwidth configuration information of cells where respective user equipments performing device to device communication are located to represent the transmission resources with unified indexes for respective user equipments.

13. The apparatus according to Item 9, wherein the configuration information of the resource pool for respective user equipments is the same.

14. The apparatus according to any one of Items 2 to 13, wherein configuration of the retransmission number relevant information is the same in all the user equipments.

15. The apparatus according to any one of Items 2 to 13, wherein the signal transmission of device to device communication comprise at least one of device to device data transmission, scheduling assignment information transmission and discovery signal transmission.

16. The apparatus according to Item 1 or 2, wherein the transmitting unit is further configured to transmit information of a discovery period of a discovery signal for device to device communication to the user equipment performing device to device communication, and the user equipment performing device to device communication transmits the discovery signal in the discovery period.

17. The apparatus according to Item 16, further comprising:
a time-frequency resource allocation scheme selecting unit configured to select a time-frequency resource allocation scheme for transmission of the discovery signal according to a resource allocation manner,
wherein the transmitting unit further transmits the time-frequency resource allocation scheme to the user equipment performing device to device communication.

18. The apparatus according to Item 16 or 17, wherein a plurality of user equipments performing device to device communication share a transmission resource pool for the discovery signal, the configuration information further comprises information of the transmission resource pool for the discovery signal, and
the configuration information is comprised in a system information block to be broadcast, so as to be provided to the plurality of user equipments performing device to device communication.

19. The apparatus according to Item 16 or 17, wherein the apparatus divides, according to user equipments requesting to perform device to device communication, a transmission resource pool for the discovery signal into a plurality of sub resource pools orthogonal to each other, and allocates the plurality of sub resource pools to the user equipments requesting to perform device to device communication respectively, and the transmitting unit is configured to transmit configuration information of the sub resource pools and configuration information of the discovery period to the user equipments requesting to perform device to device communication through dedicated signaling.

20. The apparatus according to Item 1, wherein the apparatus is a user equipment participating in device to device communication, and the transmitting unit is further configured to comprise the configuration information in scheduling assignment information to notify a counterpart user equipment performing device to device communication with the apparatus of the retransmission number relevant information.

21. The apparatus according to Item 20, wherein configuration of the retransmission number relevant information is different among respective user equipments.

22. An apparatus on user equipment side in a wireless communication system, the apparatus comprising:
a signal transceiving unit configured to receive configuration information comprising retransmission number relevant information, wherein the retransmission number relevant information indicates information relevant to the number of retransmissions of signal transmission between user equipments performing device to device communication; and
a controlling unit configured to control, according to the received retransmission number relevant information, the signal transceiving unit to repeatedly transmit a signal to a counterpart user equipment.

23. The apparatus according to Item 22, wherein the received configuration information further comprises configuration information of a discovery period, the controlling unit controls, according to the configuration information of the discovery period and the retransmission number relevant information, the signal transceiving unit to repeatedly transmit a discovery signal, and the user equipments performing device to device communication transmit the discovery signal in the discovery period.

24. The apparatus according to Item 22, wherein the signal transceiving unit is further configured to receive indication information of transmission resources allocated to perform device to device communication with the counterpart user equipment, the indication information of the transmission resources comprises a first transmission resource indication indicating first transmission resource for first signal transmission, and the controlling unit is further configured to control, based on the indication information of the transmission resources, the signal transceiving unit to transmit the signal to the counterpart user equipment using corresponding transmission resources.

25. The apparatus according to Item 24, wherein the indication information of the transmission resources further comprises a retransmission frequency hopping indication flag indicating whether to apply frequency hopping technology to signal retransmission, the controlling unit determines retransmission resources for signal retransmission based on the retransmission frequency hopping indication flag and the first transmission resource indication, and generates scheduling assignment information for the counterpart user equipment to be transmitted by the signal transceiving unit, the scheduling assignment information comprising at least the first transmission resource indication and the retransmission frequency hopping indication flag for the counterpart user equipment to determine the first transmission resource and the retransmission resources, and in a case that the retransmission frequency hopping indication flag indicates that the frequency hopping technology is to be applied to the retransmission, frequencies of each of the retransmission resources and a last transmission resource are at least different.

26. The apparatus according to Item 24, wherein the controlling unit determines whether to apply frequency hopping technology to signal retransmission to the counterpart user equipment, determines retransmission resources for signal retransmission based on the first transmission resource indication, and generates scheduling assignment information for the counterpart user equipment to be transmitted by the signal transceiving unit, and in a case that the frequency hopping technology is determined to be applied to the signal retransmission, frequencies of each of the retransmission resources and a last transmission resource are at least different.

27. The apparatus according to Item 26, wherein the controlling unit further generates a retransmission frequency hopping indication flag to indicate whether to apply frequency hopping technology to signal retransmission to the counterpart user equipment, and the scheduling assignment information comprises at least the first transmission resource indication and the retransmission frequency hopping indication flag for the counterpart user equipment to determine the first transmission resource and the retransmission resources.

28. The apparatus according to Item 24, wherein the controlling unit is configured to map the first transmission resource indication to an area for device to device communication in an uplink transmission bandwidth, and a frequency corresponding to the mapped first transmission resource is close to a physical uplink control channel.

29. The apparatus according to Item 24, wherein the indication information of the transmission resources further comprises a retransmission resource indication indicating retransmission resources for signal retransmission.

30. The apparatus according to Item 22, wherein the configuration information further comprises configuration information of a data signal resource pool for data signal transmission in device to device communication, and the controlling unit selects from the data signal resource pool data signal transmission resources for performing data signal transmission with the counterpart user equipment, and the controlling unit further generates scheduling assignment information comprising information relevant to the data signal transmission resources to be transmitted to the counterpart user equipment by the signal transceiving unit, and the information relevant to the data signal transmission resources comprises a first transmission resource indication indicating first transmission resource for first transmission of a data signal.

31. The apparatus according to Item 30, wherein the configuration information further comprises a retransmission frequency hopping indication flag indicating whether to apply frequency hopping technology to signal retransmission, the controlling unit determines retransmission resources for signal retransmission based on the retransmission frequency hopping indication flag and the first transmission resource indication, and generates scheduling assignment information for the counterpart user equipment to be transmitted by the signal transceiving unit, the scheduling assignment information comprises at least the first transmission resource indication for the counterpart user equipment to determine the first transmission resource and the retransmission resources, and in a case that the retransmission frequency hopping indication flag indicates that the frequency hopping technology is to be applied, frequencies of each of the retransmission resources and a last transmission resource are at least different.

32. The apparatus according to Item 30, wherein the controlling unit determines whether to apply frequency hopping technology to signal retransmission to the counterpart user equipment, determines retransmission resources for signal retransmission based on the first transmission resource indication, and generates scheduling assignment information for the counterpart user equipment to be transmitted by the signal transceiving unit, and in a case that the frequency hopping technology is determined to be applied to the signal retransmission, frequencies of each of the retransmission resources and a last transmission resource are at least different.

33. The apparatus according to any one of Items 25, 26, 31 and 32, wherein the controlling unit determines the retransmission resources based on whether to apply the frequency hopping technology to retransmission, the first transmission resource indication and a predetermined hopping function.

34. The apparatus according to Item 33, wherein the predetermined hopping function comprises a frequency hopping parameter for determining a bandwidth spanned between each of the retransmission resources and a last transmission resource, and wherein the frequency hopping parameter is determined by the apparatus, and the scheduling assignment information comprises the frequency hopping parameter for the counterpart user equipment to determine the retransmission resources.

35. The apparatus according to Item 33 or 34, wherein the controlling unit further generates a retransmission frequency hopping indication flag to indicate whether to apply the frequency hopping technology to signal retransmission to the counterpart user equipment, and the scheduling assignment information comprises at least the first transmission resource indication and the retransmission frequency hopping indication flag for the counterpart user equipment to determine the first transmission resource and the retransmission resources.

36. The apparatus according to Item 31 or 32, wherein in a case that it is determined to apply the frequency hopping technology to retransmission, the controlling unit selects from the data signal resource pool resource blocks with the number of retransmissions having continuous frequencies for performing multi-transmission to the counterpart user equipment.

37. The apparatus according to Item 24, wherein the signal transceiving unit is further configured to receive cell bandwidth configuration information of a cell where the counterpart user equipment is located, and the controlling unit is further configured to map the first transmission resource onto a physical uplink sharing channel corresponding to configuration information of a smallest cell bandwidth according to the received cell bandwidth configuration information, and determines retransmission resources for signal retransmission based on the smallest cell bandwidth, and a frequency span between each of the retransmission resources and a last transmission resource is larger than a predetermined threshold and smaller than the smallest cell bandwidth.

38. The apparatus according to Item 23, wherein the signal transceiving unit is further configured to receive, from a base station, a time-frequency resource allocation scheme for transmission of a discovery signal in device to device communication, and wherein the controlling unit further controls, according to the received time-frequency resource allocation scheme, the signal transceiving unit to repeatedly transmit the discovery signal.

39. The apparatus according to Item 23 or 38, wherein the signal transceiving unit further receives broadcast information comprising a discovery signal resource pool, and the controlling unit randomly selects first transmission resource for first transmission of the discovery signal from the discovery signal resource pool, and periodically selects, based on a predetermined hopping function, retransmission resources with the number of retransmissions, each of which is different from the last transmission resource both in time domain and frequency domain, within the discovery period.

40. The apparatus according to Item 23 or 38, wherein the received configuration information further comprises configuration information of a discovery signal sub resource pool, the signal transceiving unit receives the configuration information through dedicated signaling, the controlling unit randomly selects first transmission resource for the discovery signal from the discovery signal sub resource pool, and periodically selects, based on a predetermined hopping function, retransmission resources with the number of retransmissions, each of which is different from the last transmission resource both in time domain and frequency domain, within the discovery period, and the discovery signal sub resource pool is a subset of a discovery signal resource pool shared by all the user equipments performing device to device communication.

41. The apparatus according to Item 22, wherein the controlling unit is further configured to control the signal transceiving unit to repeatedly transmit, according to the retransmission number relevant information, scheduling assignment information to the counterpart user equipment using preconfigured scheduling assignment information resources.

42. An apparatus on user equipment side in a wireless communication system, the apparatus comprising:

a signal transceiving unit configured to receive configuration information comprising retransmission number relevant information, wherein the retransmission number relevant information indicates information relevant to the number of retransmissions of signal transmission between user equipments performing device to device communication; and a controlling unit configured to control, according to the received retransmission number relevant information, the signal transceiving unit to receive all signals transmitted from a counterpart user equipment.

43. The apparatus according to Item 42, wherein the received configuration information further comprises information of a discovery signal resource pool and a discovery period, the controlling unit controls, according to the discovery signal resource pool, the discovery period and the retransmission number relevant information, the signal transceiving unit to receive a discovery signal, and the user equipments performing device to device communication transmit the discovery signal in the discovery period.

44. The apparatus according to Item 43, wherein the signal transceiving unit listens to a frequency domain range corresponding to the discovery signal resource pool within the discovery period, and in a case that the discovery signal from the counterpart user equipment is received for the first time, the controlling unit determines, based on a predetermined hopping function and time-frequency resources where the discovery signal is located, time-frequency resources for a retransmitted discovery signal.

45. The apparatus according to Item 43, wherein the controlling unit jointly decodes all discovery signals received from the counterpart user equipment to acquire information contained in the discovery signals.

46. The apparatus according to Item 42, wherein the controlling unit is further configured to control the signal transceiving unit to receive, according to the retransmission number relevant information, all scheduling assignment information from the counterpart user equipment using preconfigured scheduling assignment information resources.

47. The apparatus according to Item 46, wherein the controlling unit determines first transmission resource and retransmission resources for a data signal based on the scheduling assignment information, and wherein the controlling unit further controls, according to the determined first transmission resource and retransmission resources for the data signal, the signal transceiving unit to receive all data signals transmitted from the counterpart user equipment.

48. The apparatus according to Item 47, wherein the controlling unit determines transmission resources for each of data signal transmissions based on the scheduling assignment information and a predetermined hopping function, controls the signal transceiving unit to receive the data signal from the counterpart user equipment using corresponding transmission resources, and jointly decodes all the data signals received by the signal transceiving unit to acquire data from the counterpart user equipment.

49. A method in a wireless communication system, comprising:

a configuration information generating step of generating configuration information for a user equipment performing device to device communication, the configuration information comprising retransmission number relevant information, wherein the retransmission number relevant information indicates information relevant to the number of retransmissions of signal transmission between user equipments performing device to device communication; and a transmitting step of transmitting the generated configuration information to the user equipment performing device to device communication.

50. A method in a wireless communication system, comprising:

a signal transceiving step of receiving configuration information comprising retransmission number relevant information, wherein the retransmission number relevant information indicates information relevant to the number of retransmissions of signal transmission between user equipments performing device to device communication; and a controlling step of controlling, according to the received retransmission number relevant information, to repeatedly transmit a signal to a counterpart user equipment in the signal transceiving step.

51. A method in a wireless communication system, comprising:

a signal transceiving step of receiving configuration information comprising retransmission number relevant information, wherein the retransmission number relevant information indicates information relevant to the number of retransmissions of signal transmission between user equipments performing device to device communication; and a controlling step of controlling, according to the received retransmission number relevant information, to receive all signals transmitted from a counterpart user equipment in the signal transceiving step.

The invention claimed is:

1. An apparatus in a wireless communication system, the apparatus comprising:

circuitry configured to:

generate configuration information for a user equipment performing device to device communication, the configuration information comprising retransmission number relevant information, wherein the retransmission number relevant information indicates information relevant to the number of retransmissions of signal transmission between user equipments performing device to device communication;

transmit the generated configuration information to the user equipment performing device to device communication, allocate transmission resources for signal transmission of the user equipment performing device to device communication; and transmit indication information of the transmission resources to a transmitting user equipment performing device to device communication, wherein the transmission resources comprise a first transmission resource for first signal transmission of the user equipment performing device to device communication, and wherein the transmission resources allocated by a resource scheduler further comprise retransmission resources for signal retransmission of the user equipment performing device to device communication, and a frequency span between each of the retransmission resources and a last transmission resource satisfies a predetermined condition.

2. The apparatus according to claim 1, wherein the circuitry is further configured to comprise the configuration information in a system information block, and transmit the system information block to the user equipment performing device to device communication.

3. The apparatus according to claim 1, wherein the circuitry is further configured to generate downlink control information or random access response information comprising the indication information of the transmission resources, transmit the downlink control information or the random access response information to the transmitting user equipment performing device to device communication via a corresponding channel to indicate the transmission resources for device to device communication, and comprise indication information of the first transmission resource in the downlink control information or the random access response information.

4. The apparatus according to claim 2, wherein the circuitry is further configured to compromise configuration information of a resource pool for signal transmission in device to device communication in the system information block.

5. The apparatus according to claim 1, wherein the circuitry is further configured to comprise a retransmission frequency hopping indication flag indicating whether to apply frequency hopping technology to signal retransmission in device to device communication, in the configuration information, and in a case that the frequency hopping technology is to be applied, frequencies of each of the retransmission resources for signal retransmission and a last transmission resource are at least different.

6. The apparatus according to claim 1, wherein the circuitry is further configured to determine whether to apply frequency hopping technology to signal retransmission in device to device communication to allocate the transmission resources to the user equipment performing device to device communication, and transmit, to the transmitting user equipment performing device to device communication, the indication information of the transmission resources comprising a retransmission frequency hopping indication flag indicating whether to apply the frequency hopping technology, and in a case that the frequency hopping technology is to be applied, frequencies of each of the retransmission resources for signal retransmission and a last transmission resource are at least different.

7. The apparatus according to claim 4, wherein the configuration information of the resource pool for respective user equipments is the same.

8. The apparatus according to claim 2, wherein the signal transmission of device to device communication comprise at least one of device to device data transmission, scheduling assignment information transmission, and discovery signal transmission.

9. The apparatus according to claim 1, wherein the apparatus is a user equipment participating in device to device communication, and the circuitry is further configured to comprise the configuration information in scheduling assignment information to notify a counterpart user equipment performing device to device communication with the apparatus of the retransmission number relevant information.

10. The apparatus according to claim 9, wherein configuration of the retransmission number relevant information is different among respective user equipments.

11. An apparatus on user equipment side in a wireless communication system, the apparatus comprising:

circuitry configured to:

receive configuration information comprising retransmission number relevant information, wherein the retransmission number relevant information indicates information relevant to the number of retransmissions of signal transmission between user equipments performing device to device communication;

control, according to the received retransmission number relevant information, repeatedly transmitting a signal to a counterpart user equipment;

receive indication information of transmission resources allocated to perform device to device communication with the counterpart user equipment, the indication information of the transmission resources comprising a first transmission resource indication indicating first transmission resource for first signal transmission; and control, based on the indication information of the transmission resources, to transmit the signal to the counterpart user equipment using corresponding transmission resources, wherein the indication information of the transmission resources further indicates retransmission resources for signal retransmission of the user equipment, and a frequency span between each of the retransmission resources and a last transmission resource satisfies a predetermined condition.

12. The apparatus according to claim 11, wherein the indication information of the transmission resources further comprises a retransmission frequency hopping indication flag indicating whether to apply frequency hopping technology to signal retransmission, the circuitry determines retransmission resources for signal retransmission based on the retransmission frequency hopping indication flag and the first transmission resource indication, and generates scheduling assignment information for the counterpart user equipment to be transmitted, the scheduling assignment information comprising at least the first transmission resource indication and the retransmission frequency hopping indication flag for the counterpart user equipment to determine the first transmission resource and the retransmission resources, and in a case that the retransmission frequency hopping indication flag indicates that the frequency hopping technology is to be applied to the retransmission, frequencies of each of the retransmission resources and a last transmission resource are at least different.

13. The apparatus according to claim 11, wherein the circuitry determines whether to apply frequency hopping technology to signal retransmission to the counterpart user equipment, determines retransmission resources for signal retransmission based on the first transmission resource indication, and generates scheduling assignment information for the counterpart user equipment to be transmitted, and in a case that the frequency hopping technology is determined to be applied to the signal retransmission, frequencies of each of the retransmission resources and a last transmission resource are at least different.

14. The apparatus according to claim 13, wherein the circuitry further generates a retransmission frequency hopping indication flag to indicate whether to apply frequency hopping technology to signal retransmission to the counterpart user equipment, and the scheduling assignment information comprises at least the first transmission resource indication and the retransmission frequency hopping indication flag for the counterpart user equipment to determine the first transmission resource and the retransmission resources.

15. The apparatus according to claim 11, wherein the indication information of the transmission resources further comprises a retransmission resource indication indicating retransmission resources for signal retransmission.

16. The apparatus according to claim 11, wherein the configuration information further comprises configuration information of a data signal resource pool for data signal transmission in device to device communication, and the circuitry selects from the data signal resource pool data signal transmission resources for performing data signal transmission with the counterpart user equipment, and further generates scheduling assignment information comprising information relevant to the data signal transmission resources to be transmitted to the counterpart user equipment, and the information relevant to the data signal transmission resources comprises a first transmission resource indication indicating first transmission resource for first transmission of a data signal.

17. The apparatus according to claim 16, wherein the configuration information further comprises a retransmission frequency hopping indication flag indicating whether to apply frequency hopping technology to signal retransmission, the circuitry determines retransmission resources for signal retransmission based on the retransmission frequency hopping indication flag and the first transmission resource indication, and generates scheduling assignment information for the counterpart user equipment to be transmitted, the scheduling assignment information comprises at least the first transmission resource indication for the counterpart user equipment to determine the first transmission resource and the retransmission resources, and in a case that the retransmission frequency hopping indication flag indicates that the frequency hopping technology is to be applied, frequencies of each of the retransmission resources and a last transmission resource are at least different.

18. The apparatus according to claim 16, wherein the circuitry determines whether to apply frequency hopping technology to signal retransmission to the counterpart user equipment, determines retransmission resources for signal retransmission based on the first transmission resource indication, and generates scheduling assignment information for the counterpart user equipment to be transmitted, and in a case that the frequency hopping technology is determined to be applied to the signal retransmission, frequencies of each of the retransmission resources and a last transmission resource are at least different.

19. The apparatus according to claim 12, wherein the circuitry determines the retransmission resources based on whether to apply the frequency hopping technology to retransmission, the first transmission resource indication and a predetermined hopping function.

20. The apparatus according to claim 19, wherein the predetermined hopping function comprises a frequency hopping parameter for determining a bandwidth spanned between each of the retransmission resources and a last transmission resource, and wherein the frequency hopping parameter is determined by the apparatus, and the scheduling assignment information comprises the frequency hopping parameter for the counterpart user equipment to determine the retransmission resources.

21. The apparatus according to claim 19, wherein the circuitry further generates a retransmission frequency hopping indication flag to indicate whether to apply the frequency hopping technology to signal retransmission to the counterpart user equipment, and the scheduling assignment information comprises at least the first transmission resource indication and the retransmission frequency hopping indication flag for the counterpart user equipment to determine the first transmission resource and the retransmission resources.

22. An apparatus on user equipment side in a wireless communication system, the apparatus comprising:
circuitry configured to:
receive configuration information comprising retransmission number relevant information, wherein the retransmission number relevant information indicates information relevant to the number of retransmissions of signal transmission between user equipments performing device to device communication;

control, according to the received retransmission number relevant information, receiving all signals transmitted from a counterpart user equipment;

receive indication information of transmission resources allocated to perform device to device communication with the counterpart user equipment, the indication information of the transmission resources comprising a first transmission resource indication indicating first transmission resource for first signal transmission; and control, based on the indication information of the transmission resources, to receive the signal from the counterpart user equipment using corresponding transmission resources, wherein the indication information of the transmission resources further indicates retransmission resources for signal retransmission of the counterpart user equipment, and a frequency span between each of the retransmission resources and a last transmission resource satisfies a predetermined condition.

23. A method in a wireless communication system, comprising:

generating configuration information for a user equipment performing device to device communication, the configuration information comprising retransmission number relevant information, wherein the retransmission number relevant information indicates information relevant to the number of retransmissions of signal transmission between user equipments performing device to device communication;

transmitting the generated configuration information to the user equipment performing device to device communication;

allocating transmission resources for signal transmission of the user equipment performing device to device communication; and transmitting indication information of the transmission resources to a transmitting user equipment performing device to device communication, wherein the transmission resources comprise a first transmission resource for first signal transmission of the user equipment performing device to device communication, and wherein the transmission resources allocated by a resource scheduler further comprise retransmission resources for signal retransmission of the user equipment performing device to device communication, and a frequency span between each of the retransmission resources and a last transmission resource satisfies a predetermined condition.

24. A method in a wireless communication system, comprising:

receiving configuration information comprising retransmission number relevant information, wherein the retransmission number relevant information indicates information relevant to the number of retransmissions of signal transmission between user equipments performing device to device communication; and controlling, according to the received retransmission number relevant information, to repeatedly transmit a signal to a counterpart user equipment or to receive all signals transmitted from a counterpart user equipment;

receiving indication information of transmission resources allocated to perform device to device communication with the counterpart user equipment, the indication information of the transmission resources comprising a first transmission resource indication indicating first transmission resource for first signal transmission; and controlling, based on the indication information of the transmission resources, to transmit the signal to the counterpart user equipment using corresponding transmission resources, wherein the indication information of the transmission resources further indicates retransmission resources for signal retransmission of the user equipment, and a frequency span between each of the retransmission resources and a last transmission resource satisfies a predetermined condition.

25. The apparatus according to claim 1, wherein the frequency span is maximized or is an integral multiple of the number of sub bands.

26. The apparatus according to claim 1, wherein the frequency span is greater than a predetermined threshold and less than a smallest cell bandwidth.

27. The apparatus according to claim 11, wherein the frequency span is maximized or is an integral multiple of the number of sub bands.

28. The apparatus according to claim 11, wherein the frequency span is greater than a predetermined threshold and less than a smallest cell band width.

* * * * *